US009121965B2

(12) United States Patent
Al-Jadani

(10) Patent No.: US 9,121,965 B2
(45) Date of Patent: Sep. 1, 2015

(54) LOW FREQUENCY PASSIVE SEISMIC DATA ACQUISITION AND PROCESSING

(71) Applicant: Saudi Arabian Oil Company, Dhahran (SA)

(72) Inventor: Mohammad Abdulghani Al-Jadani, Jeddah (SA)

(73) Assignee: Saudi Arabian Oil Company, Dhahran (SA)

( * ) Notice: Subject to any disclaimer, the term of this patent is extended or adjusted under 35 U.S.C. 154(b) by 332 days.

(21) Appl. No.: 13/793,764

(22) Filed: Mar. 11, 2013

(65) Prior Publication Data

US 2014/0254319 A1    Sep. 11, 2014

(51) Int. Cl.
*G01V 1/28*        (2006.01)
*G01V 1/36*        (2006.01)

(52) U.S. Cl.
CPC ........ *G01V 1/28* (2013.01); *G01V 1/288* (2013.01); *G01V 1/364* (2013.01); *G01V 2210/123* (2013.01)

(58) Field of Classification Search
CPC ......... G01V 1/28; G01V 1/364; G01V 1/288; G01V 2210/123
USPC .......................................... 367/38, 43, 49, 53
See application file for complete search history.

(56) References Cited

U.S. PATENT DOCUMENTS

| | | | |
|---|---|---|---|
| 3,395,386 A * | 7/1968 | Brown et al. | 367/43 |
| 7,051,808 B1 * | 5/2006 | Vinegar et al. | 166/250.1 |
| 7,729,862 B2 | 6/2010 | Dewarrat | |
| 2008/0021655 A1 | 1/2008 | Saenger | |
| 2008/0021656 A1 | 1/2008 | Saenger | |
| 2008/0151689 A1 * | 6/2008 | Goujon | 367/24 |
| 2008/0288173 A1 | 11/2008 | Saenger | |
| 2009/0175126 A1 | 7/2009 | Lambert et al. | |
| 2010/0153015 A1 | 6/2010 | Podladchikov et al. | |
| 2010/0161233 A1 | 6/2010 | Saenger et al. | |
| 2010/0315902 A1 | 12/2010 | Liang et al. | |
| 2011/0082646 A1 | 4/2011 | Halliday et al. | |
| 2011/0255371 A1 | 10/2011 | Jing et al. | |

FOREIGN PATENT DOCUMENTS

GB        2467326 A        8/2010

OTHER PUBLICATIONS

Graf et al., "Passive low frequency spectral analysis: Exploring a new field in geophysics," World Oil, Jan. 2007, pp. 47-52.*

(Continued)

*Primary Examiner* — Daniel L Murphy
(74) *Attorney, Agent, or Firm* — Bracewell & Giuliani LLP; Constance G. Rhebergen; Albert B. Kimball, Jr.

(57) ABSTRACT

Low sensitivity, single vertical axis or uniaxial transducer sensors are deployed along receiver lines across an area of interest to acquire low frequency passive seismic data from the earth. Recordings formed of the acquired low frequency passive seismic data are decomposed in the frequency-wavenumber (F-K) domain according to wavefront dipping angles into mono-dominant velocity seismic records. Resulting seismic waves of different types are identifiable based on the different dipping angles. Wavefields can then be analyzed separately in either time or frequency domains and analyzed or integrated with other data.

11 Claims, 31 Drawing Sheets

(56) References Cited

OTHER PUBLICATIONS

Ali et al., "Results from a low frequency passive seismic experiment over an oilfield in Abu Dhabi", First Break, Apr. 2009, pp. 91-97, vol. 27, European Association of Geoscientist & Engineers.

Al-Jadani, "Directive Geophone", 72nd EAGE Conference & Exhibition incorporating SPE EUROPEC 2010 Barcelona, Spain, Jun. 14-17, 2010, pp. 1-5, European Association of Geoscientist & Engineers.

Archer et al., "Obtaining low frequency seismic data, onshore and in shallow water", First Break, Jan. 2012, pp. 79-87, vol. 30, European Association of Geoscientist & Engineers.

Henry C. Bland, "An analysis of passive seismic recording performance", CREWES Research Report, 2006, pp. 1-9, vol. 18.

Hanssen, "Passive Seismic Methods for Hydrocarbon Exploration" 73rd EAGE Conference & Exhibition incorporating SPE EUROPEC 2011, Vienna Austria, May 23-26, 2011, pp. 1-5, European Association of Geoscientist & Engineers.

Martin Landro and Lasse Amundsen, "Low-frequency Seismic Noise: The Music of oil?", GEO ExPro, Feb. 2008, pp. 48-50.

Mastrigt and Al-Dulaijan, "Seismic Spectroscopy Using Amplified 3C Geophones", 70th EAGE Conference & Exhibition, Jun. 9-12, 2008, pp. 1-5, Rome, Italy, European Association of Geoscientist & Engineers.

Mordret et al., "Low Frequency Passive Siesmic Tomography using Valhall LoFS", Third Passive Seismic Workshop-Actively Passive!, Mar. 27-30, 2011, pp. 1-5, Athens, Greece.

Saenger et al., "A passive seismic survey over a gas field: Analysis of low-frequency anomalies", Geophysics, 2009, pp. 29-40, vol. 74, No. 2.

Saenger et al., "A Low Frequency Passive Seismic Survey in Libya", Detective stories behind prospect generation: challenges and the way forward, Muscat, Oman, Apr. 19-22, 2009, pp. 1-7.

Tan et al., "Passive seismic event-classification techniques applied to heavy oil production from Cold Lake, Alberta", Society of Exploration Geophysicists, 2007, pp. 1-5, European Association of Geoscientist & Engineers.

Walker, "Recent developments in low frequency spectral analysis of passive seismic data", First Break, Feb. 2008, pp. 69-77, vol. 26, European Association of Geoscientist & Engineers.

Zheng et al., "Analyzing low-frequency seismic noise employing seismic interferometry (SI) and time-reversal modeling (TRM)—a controlled-data feasibility study", SEG Houston International Exposition and Annual Meeting, 2009, pp. 1683-1687.

International Search Report and Written Opinion for Related PCT Application PCT/US2014/022249, Nov. 26, 2014.

* cited by examiner

US 9,121,965 B2

LOW FREQUENCY PASSIVE SEISMIC DATA ACQUISITION AND PROCESSING

BACKGROUND OF THE INVENTION

1. Field of the Invention

The present invention relates to the acquisition and processing of low frequency passive seismic data.

2. Description of the Related Art

There have been a number of attempts to collect seismic data in the low frequency range (0 to 5 Hz) with either active or passive sources. This data was thought to have potential in resolving problems in ways not available through conventional seismic methods. Among the potential areas considered, for example, were: lowering uncertainty levels in conventional seismic data; improving inversion results and resultant seismic images; providing data about full wave inversion (or FWI); and enabling better pre-stack depth imaging in areas with complex velocity structures.

In comparison with active seismic data, low frequency passive seismic signals originated from natural origins rather than conventional active seismic sources such as vibroseis or impulse sources. Low frequency passive seismic data could thus be acquired without the need to deploy active seismic sources(s) and thus cost much less. Low frequency passive seismic data has been deployed in some regions for use as direct hydrocarbon indicator tools.

However, so far as is known, high sensitivity, three-component direction or 3-C sensors were considered to be obligatory for low frequency passive seismic data acquisition. The three-component sensors were composed of transducers arranged in a common housing on mutually intersecting axes to sense the total vector of ground displacement. Built-in electronics were included in three-component sensors for preamplification of the electrical signals formed by the sensor transducers.

Although passive acquisition with 3-C sensors was less costly than active surveys, so far as is known there were limitations in use of passive 3-C sensors. The 3-C sensors with built in pre-amplifier electronics were expensive. The coverage area and density available was limited and sparse. There were also problems in identifying the type of seismic waves present in the data and in identifying the sources of the signals recorded.

Low sensitivity sensors were reported to be unsuitable for recording low frequency passive seismic data. This was particularly the case for what were known as uniaxial or single axis vertical sensors which had a single transducer which sensed movement along a single vertical axis.

SUMMARY OF THE INVENTION

Briefly, the present invention provides a new and improved method of acquiring low frequency seismic data about the travel of naturally occurring seismic waves through the earth in a region of interest. Uniaxial sensors are deployed along a receiver line at the surface of the earth in the region of interest. Movements of the earth in response to the travel of naturally occurring seismic waves are sensed with the deployed uniaxial sensors. A record of sensed earth movements is formed as a function of time to provide seismic data. The passive seismic data record is decomposed according to wave-front angles into different waveforms, and the decomposed passive seismic data is then processed.

BRIEF DESCRIPTION OF THE DRAWINGS

FIGS. 4A-1 and 4A-2 are displays in the frequency-wavenumber or FK domain of recorded low frequency passive seismic data of a receiver line.

DETAILED DESCRIPTION OF THE PREFERRED EMBODIMENTS

Figure 1:
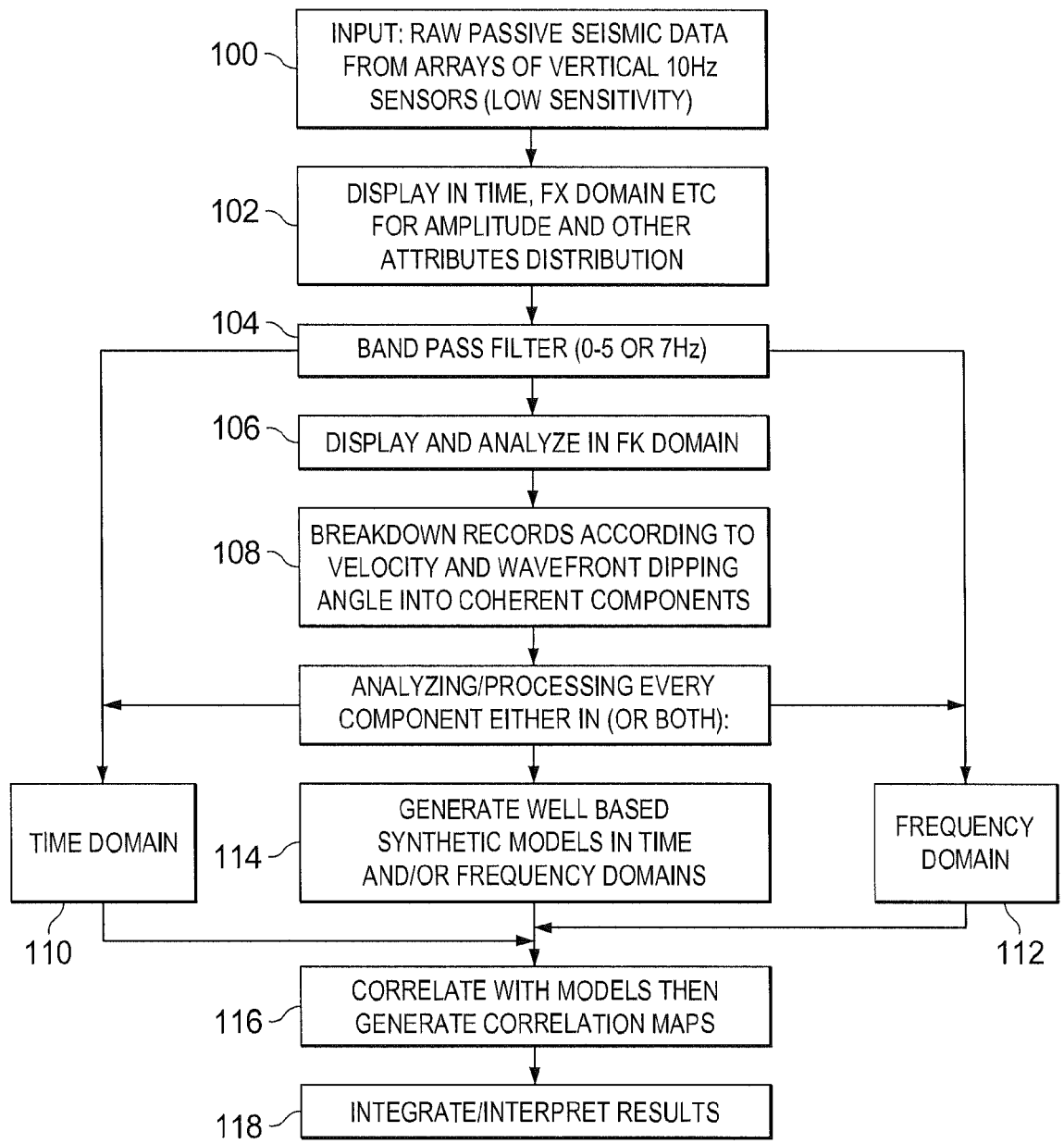
FIG. 1 is a functional block diagram or flow chart of a sequence of acquisition and processing of low frequency passive seismic data according to the present invention.

According to the present invention, it has been found that low frequency passive seismic (LFPS) signals can be acquired using conventional 10 Hz single vertical or uniaxial geophones which had previously been considered suitable only for conventional active seismic survey acquisition of the type currently being utilized throughout the industry. The uniaxial or vertical geophones have reduced sensitivity in comparison with the tri-axial or 3-C seismic sensor geophones considered necessary for low frequency passive seismic signal acquisition. Typically, uniaxial sensors have a low sensitivity of, for example, a single sensor can have about 22.8 Volts/meter/second (V/m/s), in comparison with sensitivities of from about 900-4000 V/m/s for tri-axial sensors. So far as is known, it was reported in the industry that uniaxial geophones could not record low frequency passive seismic signals, due to their low sensitivities and inability to amplify such signals. Thus, it was believed that only pre-amplified 3-C geophones with high sensitivity were suitable to record low frequency passive seismic signals.

With the present invention, it has been found that in conjunction with processing techniques, low frequency passive seismic data of satisfactory quality for analysis and further processing can be acquired in the field with conventional uniaxial vertical sensors. A suitable such sensor according to the present invention may be, for example, the SG-10 available from Sercel. It should be understood, however, that other low sensitivity vertical sensors could equally as well be used.

The low frequency passive seismic data so acquired is in a frequency spectrum below the auditory range of humans and is in a frequency range below 20 Hz. As will be set forth, the energy sensed by the uniaxial sensors is band pass filtered during processing to a frequency range below 10 Hz and typically from 0 to 7 Hz. The low frequency passive seismic data after acquisition by the uniaxial sensors is processed to obtain categorizations of the types of naturally occurring seismic waves present.

With the present invention uniaxial or vertical sensors are deployed along a receiver line at the surface of the earth in the region of interest. Naturally occurring low frequency passive seismic signals present in the earth in the region of interest are sensed by the deployed sensors and recorded as indicated at step 100 (FIG. 1) using a single array or multiple arrays of conventional uniaxial vertical sensors. As has been noted, these vertical uniaxial sensors have a low sensitivity in contrast to that of the tri-axial sensors previously thought necessary for low frequency seismic data acquisition.

A record of sensed earth movements is thus formed as passive seismic data as a function of time. The recording with the present invention can preferably be performed during daily background noise recordings in areas of interest. As such, the recordings are optionally of 6-18 sec recording lengths. In low frequency passive seismic signal acquisition according to the present invention, an unlimited number of receiver stations with uniaxial vertical sensors in either 2D or 3D acquisition types can be used to record low frequency passive seismic signals. For example, one of the experiments was conducted over several 3D seismic survey batches each of them composed of 24 receiver lines, and each line containing 362 spaced receiver stations, with each station consists of 36 uniaxial vertical sensors. An acquisition array of stations this size was chosen to allow better analysis and to provide better utilization of such data in both 2D and 3D acquisition types.

Figure 2A:
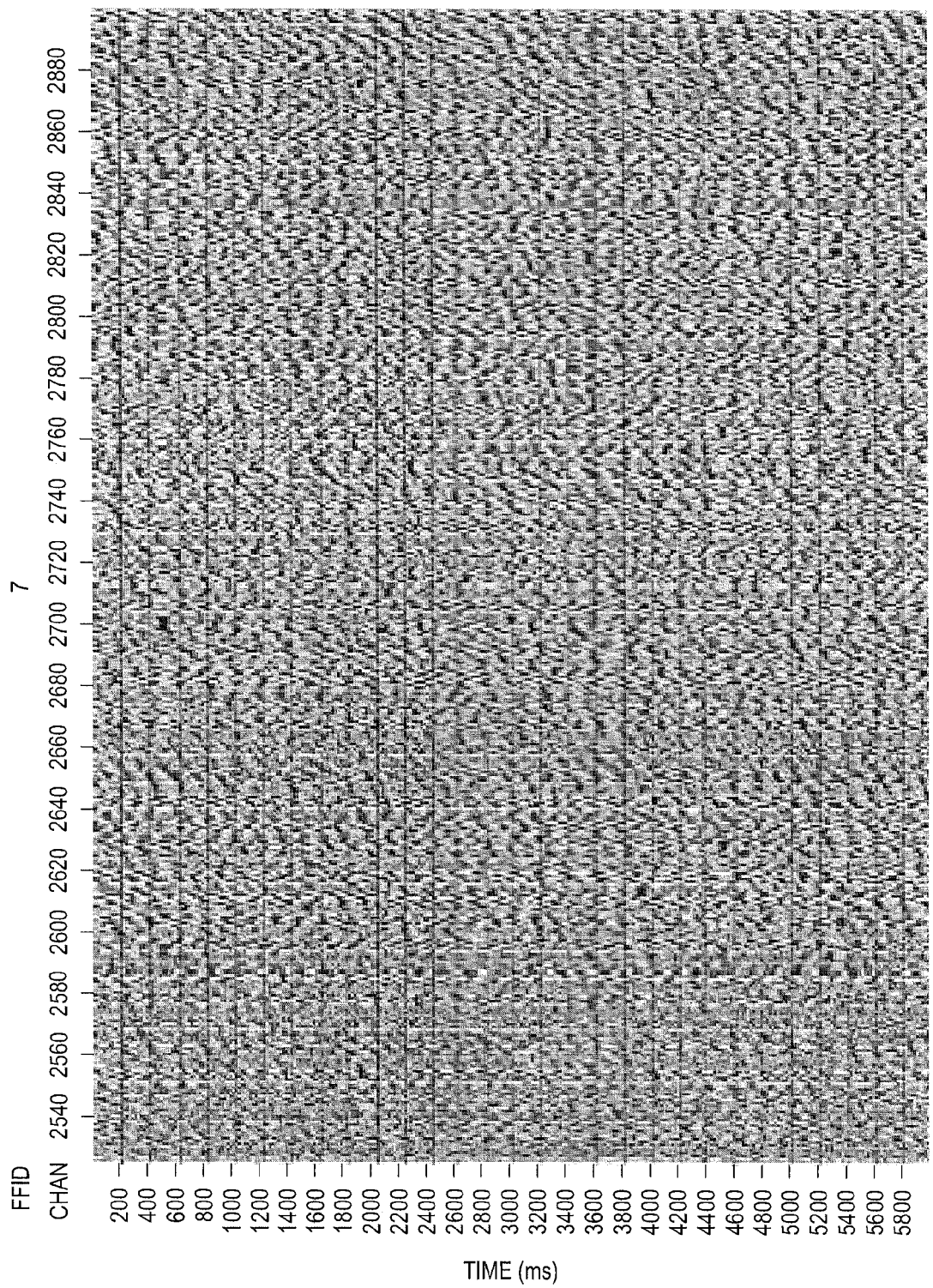
FIG. 2A is a display of raw low frequency passive seismic data record of a receiver line in the time domain according to the present invention.

Also during step 100, the recorded low frequency passive seismic data so acquired may be initially displayed in the time domain with automatic gain control or AGC in the conventional manner FIG. 2A is an example display of raw low frequency passive seismic data as a result. At this stage, some coherent events can be observed but are very hard to identify due to interference with other noisy data.

Figure 2B:
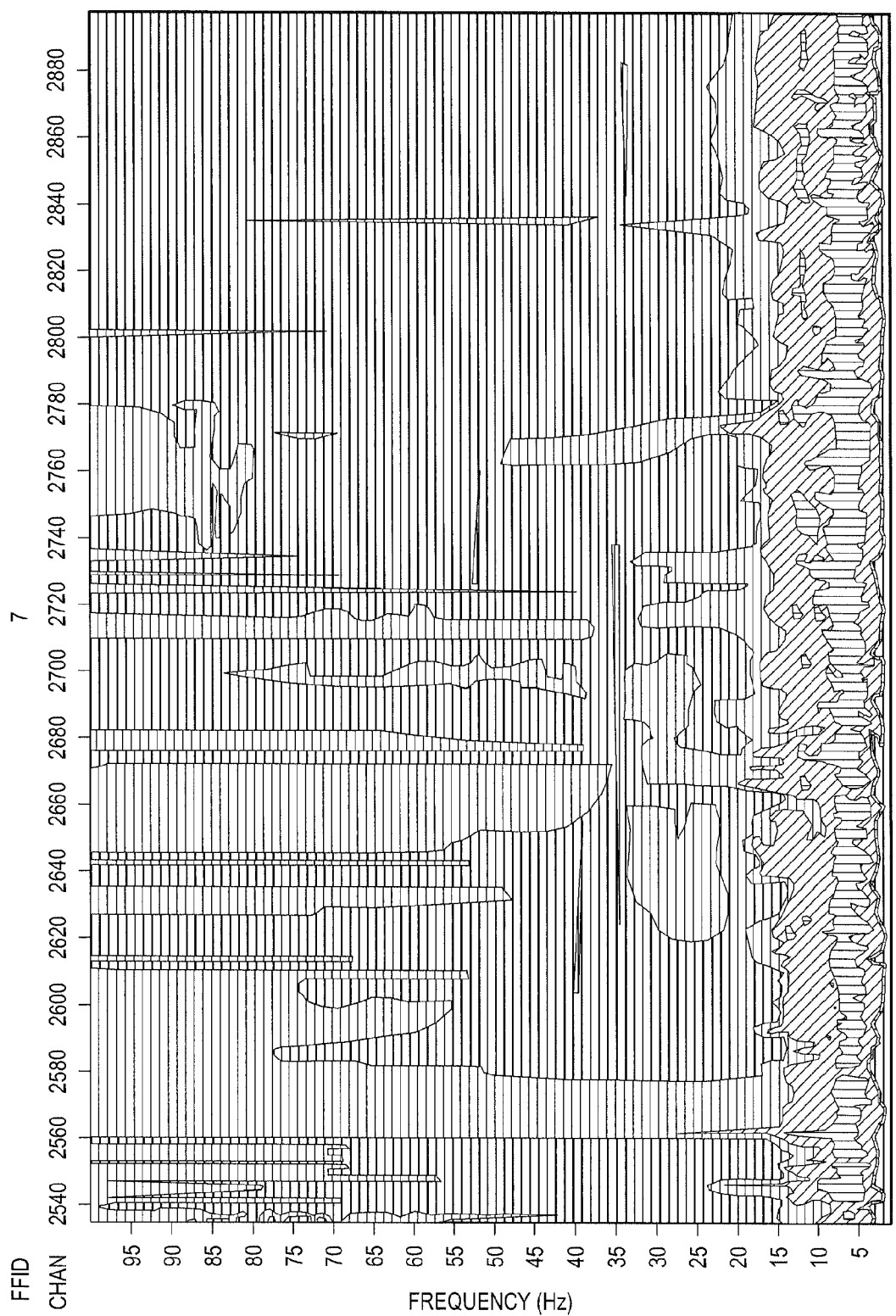
FIG. 2B is a display in the frequency-space domain of the recorded low frequency passive seismic data of FIG. 2A.
Figure 2C:
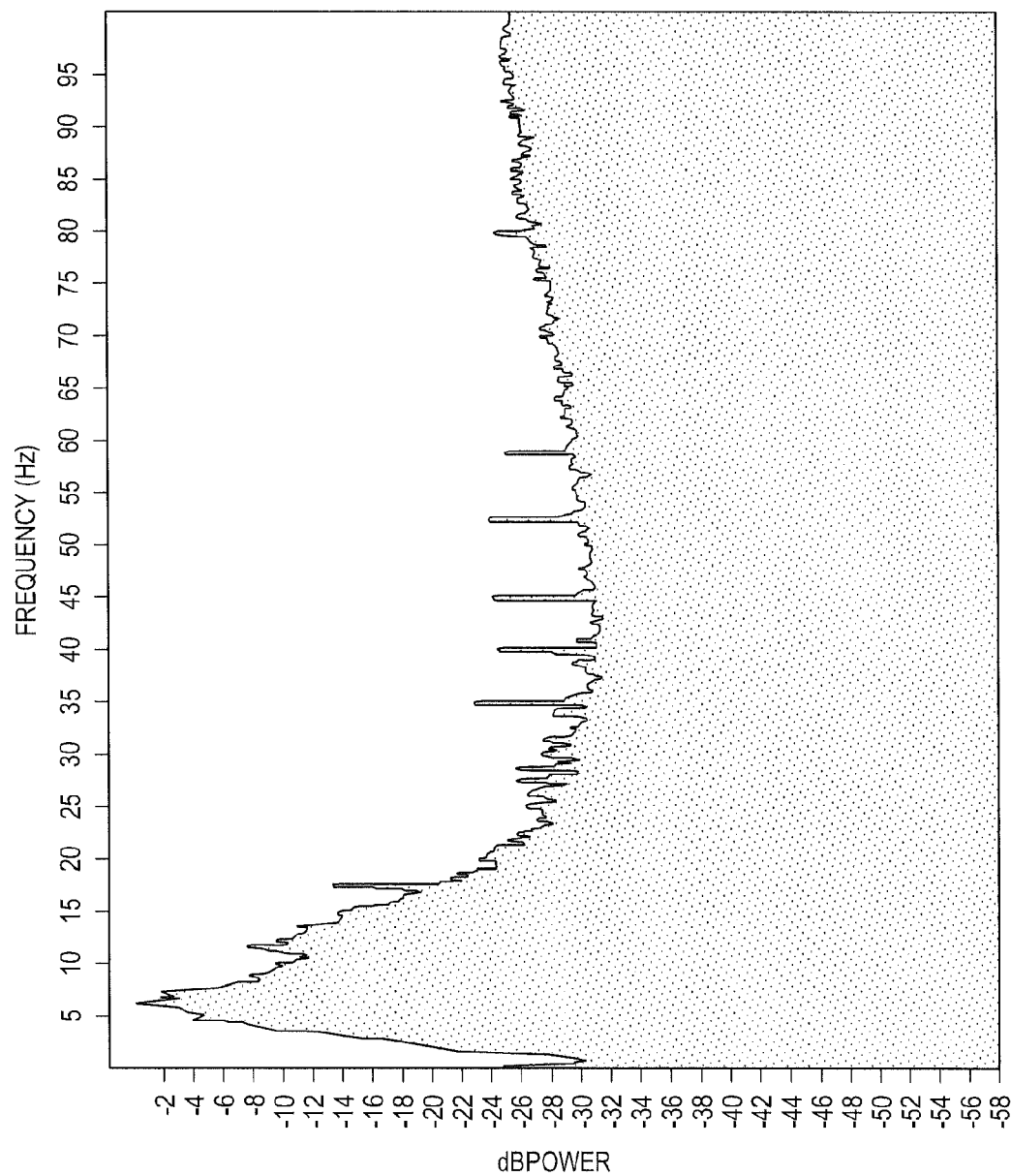
FIG. 2C is a display of the power spectrum of the recorded low frequency passive seismic data of FIG. 2A.
Figure 2D:
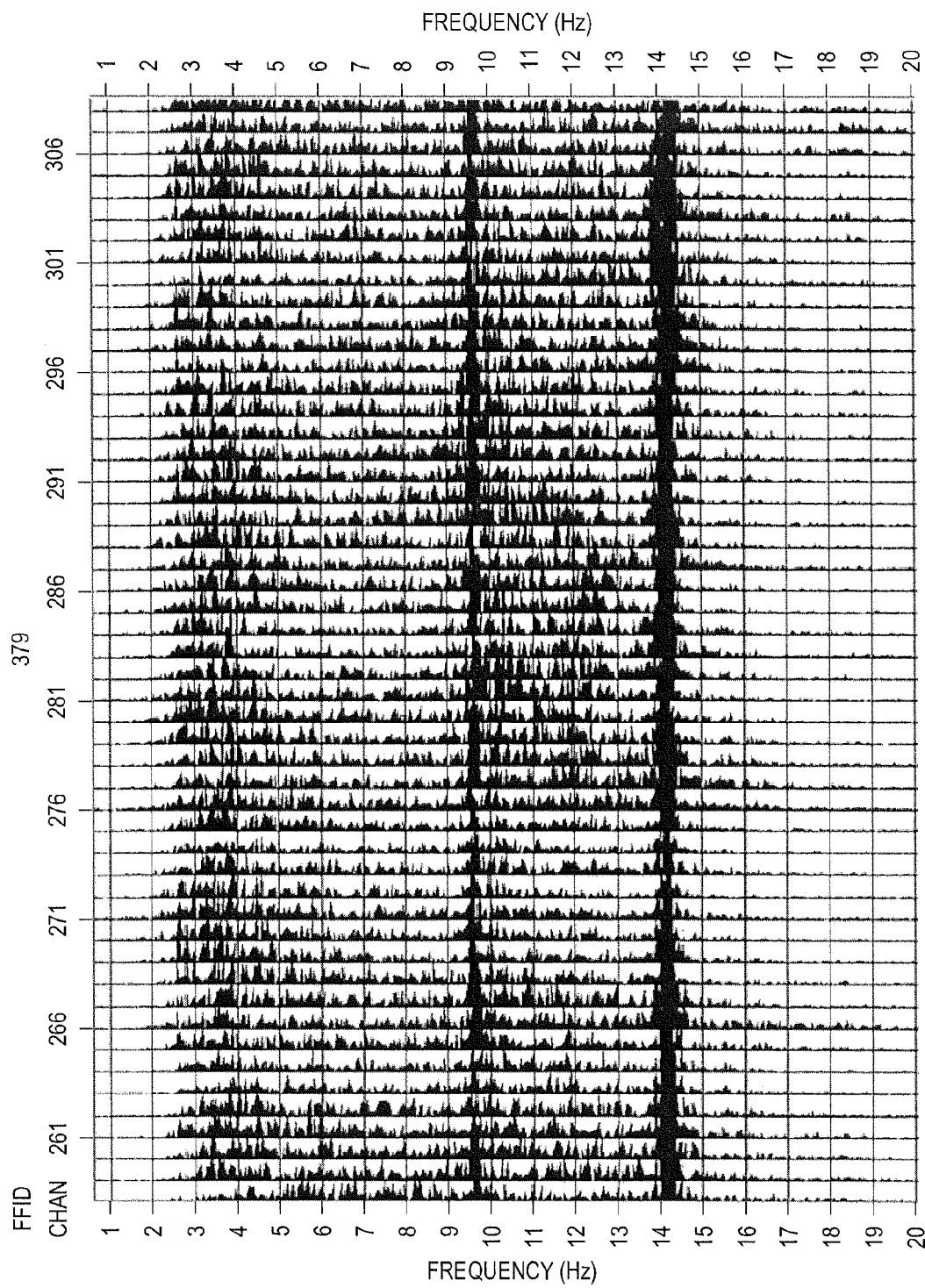
FIG. 2D is a display in the frequency domain of the recorded low frequency passive seismic data of FIG. 2A.
Figure 3A:
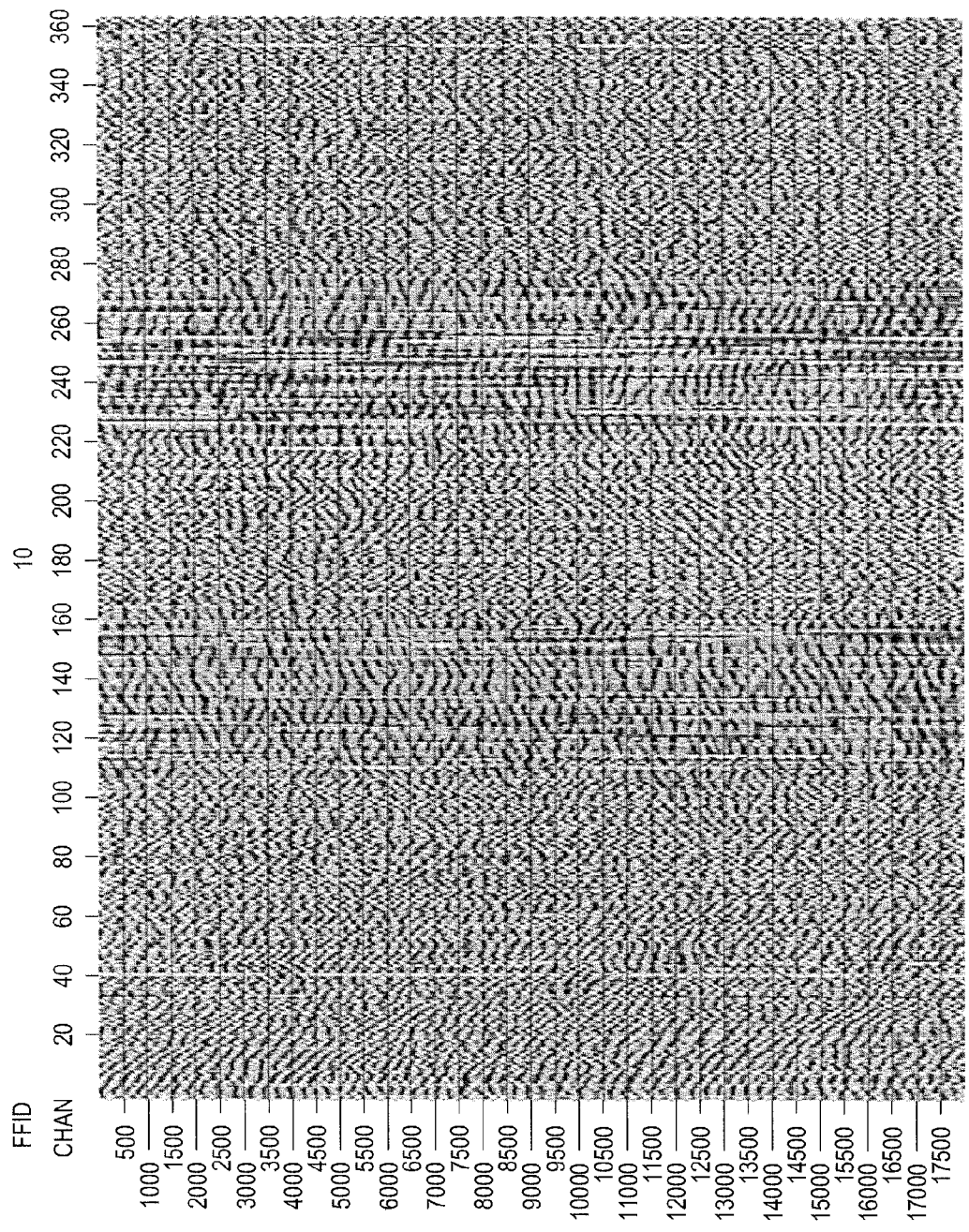
FIG. 3A is a display of raw low frequency data record of a receiver line in the time domain after applying 0-5 Hz bandpass filter.
Figure 3B:
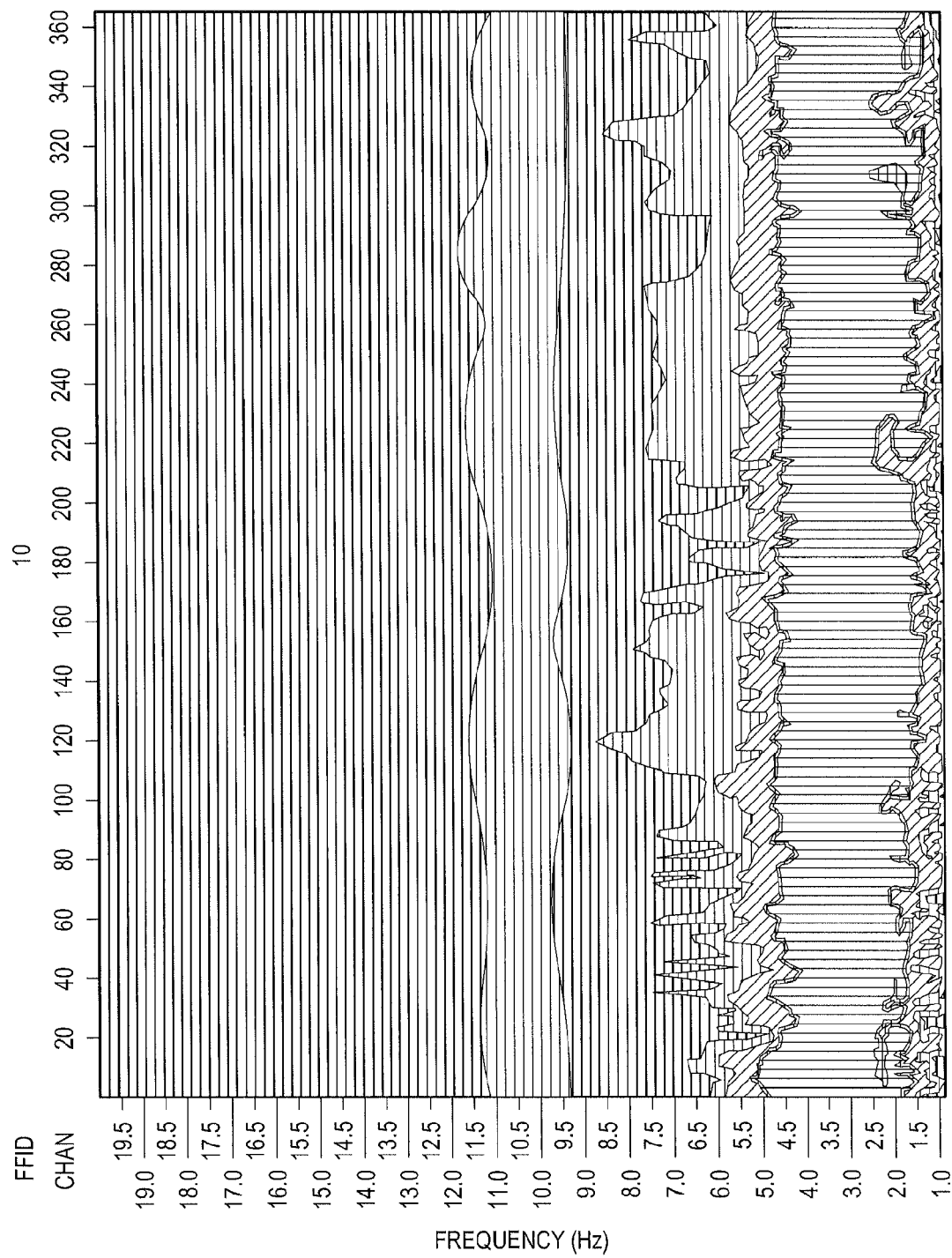
FIG. 3B is a display in the frequency-space domain of the recorded low frequency passive seismic data of FIG. 3A.
Figure 3C:
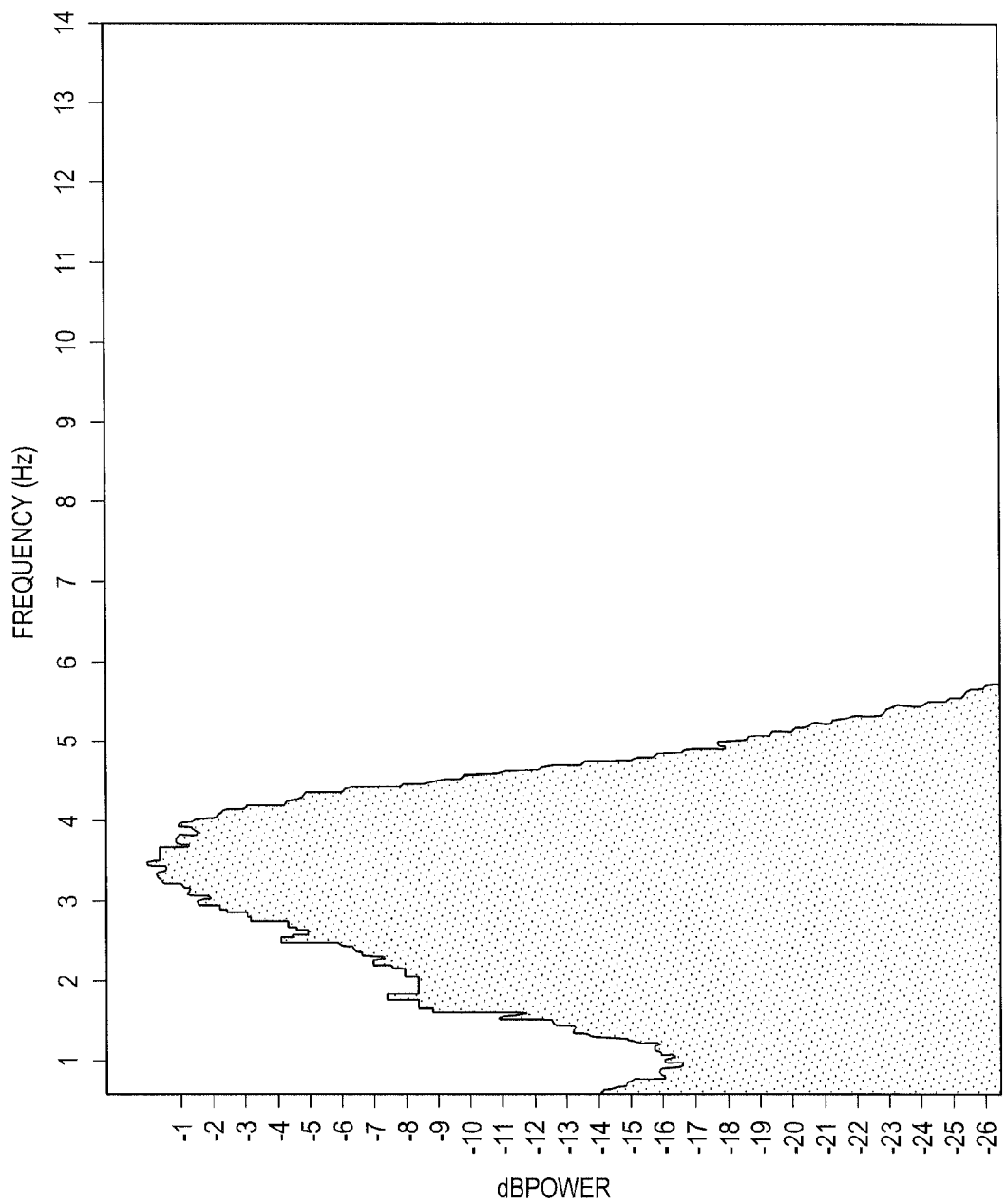
FIG. 3C is a display the power spectrum of the recorded low frequency passive seismic data of FIG. 3A.
Figure 3D:
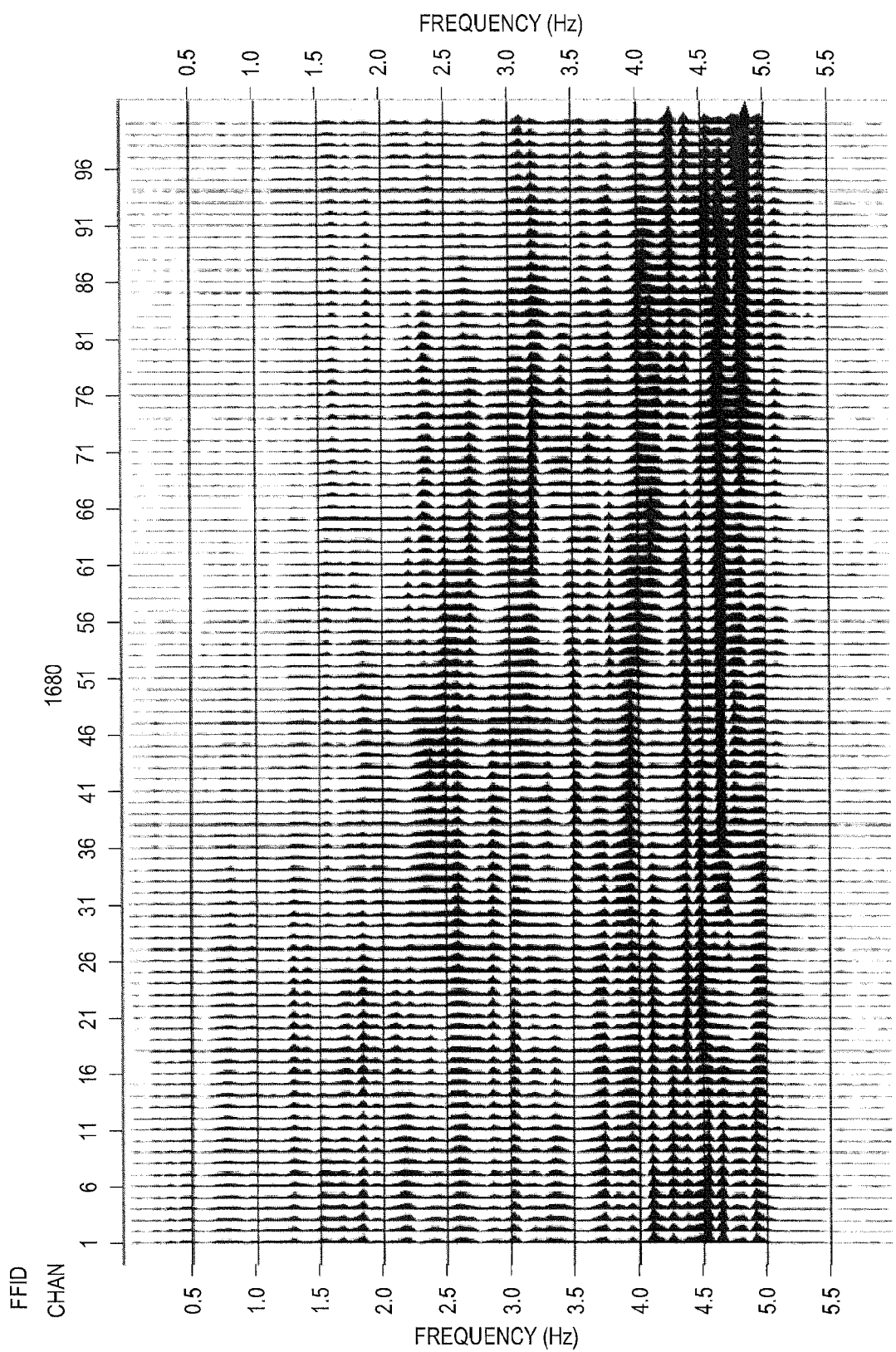
FIG. 3D is a display in the frequency domain of the recorded low frequency passive seismic data of FIG. 3A.

During step 102, the raw low frequency passive seismic data are processed in a seismic data processing computer system (such as those available as ProMax® from Landmark Graphics Corporation or Omega® from Western Geco) for display in the frequency-distance, and frequency domains. It should be understood that other seismic data processing systems can also be used. FIGS. 2B, 2C, and 2D are example displays in the FX domain, power spectrum, and in frequency domain, respectively, of the raw low frequency passive seismic data of FIG. 2A after processing according to step 102.

During step 104, the low frequency passive seismic data is then subjected to bandpass filtering computer processing to remove frequency components above specified low frequency limits in the data. The bandpass filtering limits the frequency spectrum of the passive seismic data to below 10 Hz, and preferably to a bandwidth of from 0 to about 5 or about 7 Hz. FIGS. 3A, 3B, 3C, and 3D show the output in time domain, FX domain, the power spectrum, and in frequency domain respectively.

It is to be noted that when applying the bandpass filtering (0-5 Hz), it becomes possible according to the present invention to observe some of the hidden relatively higher amplitude of low frequency passive seismic signals, while low amplitude can be amplified too through AGC (FIGS. 3A, 3B, 3C, and 3D). After step 104, the output low frequency passive seismic signals can be further analyzed, either in time and/or frequency domains (steps 110 and 112) or it can be processed further in the frequency-wavenumber or FK domain (steps 106 and 108).

During step 106, the bandpass filtered low frequency passive seismic data in the time domain output from step 104 are further processed in a seismic data processing computer system and displayed in the frequency-wavenumber or FK domain. With the present invention, the low frequency passive seismic data collected through receiver lines in the passive mode has been found to form a sort of a tree shape when displayed in the FK domain.

This is evident from FIGS. 4A-1, 4A-2, 4B, and 4C which are example displays in the frequency-wavenumber domain of three different receiver lines recorded in Southeastern, Central, and Eastern Saudi Arabia respectively. The tree shapes are indicated in these figures by the magenta portions of the display located in the yellow-green background.

During step 108, the resultant low frequency passive seismic data in the FK domain from step 106 is further processed in the seismic data processing computer system and decomposed into coherent components through FK filtering processes in the FK domain. That is, every low frequency passive seismic component or waveform in this domain has a certain velocity and a dip angle which is the angle of the propagation direction with Earth's surface, and thus easier to be extracted in this domain.

Figure 5A:
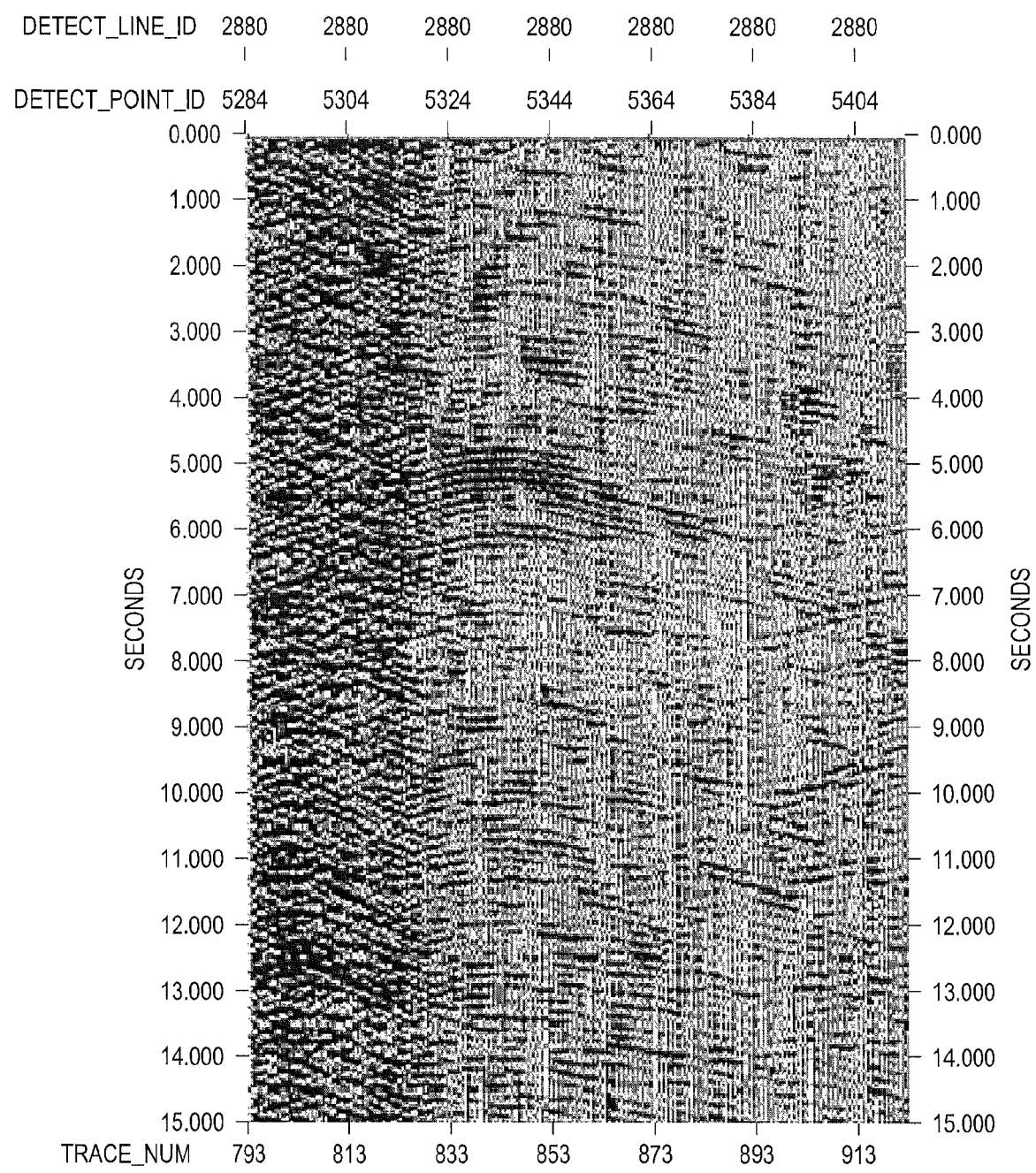
FIG. 5A is a display in the time domain of recorded low frequency passive seismic data after 0-7 Hz bandpass filter for a single receiver line.
Figure 5B:
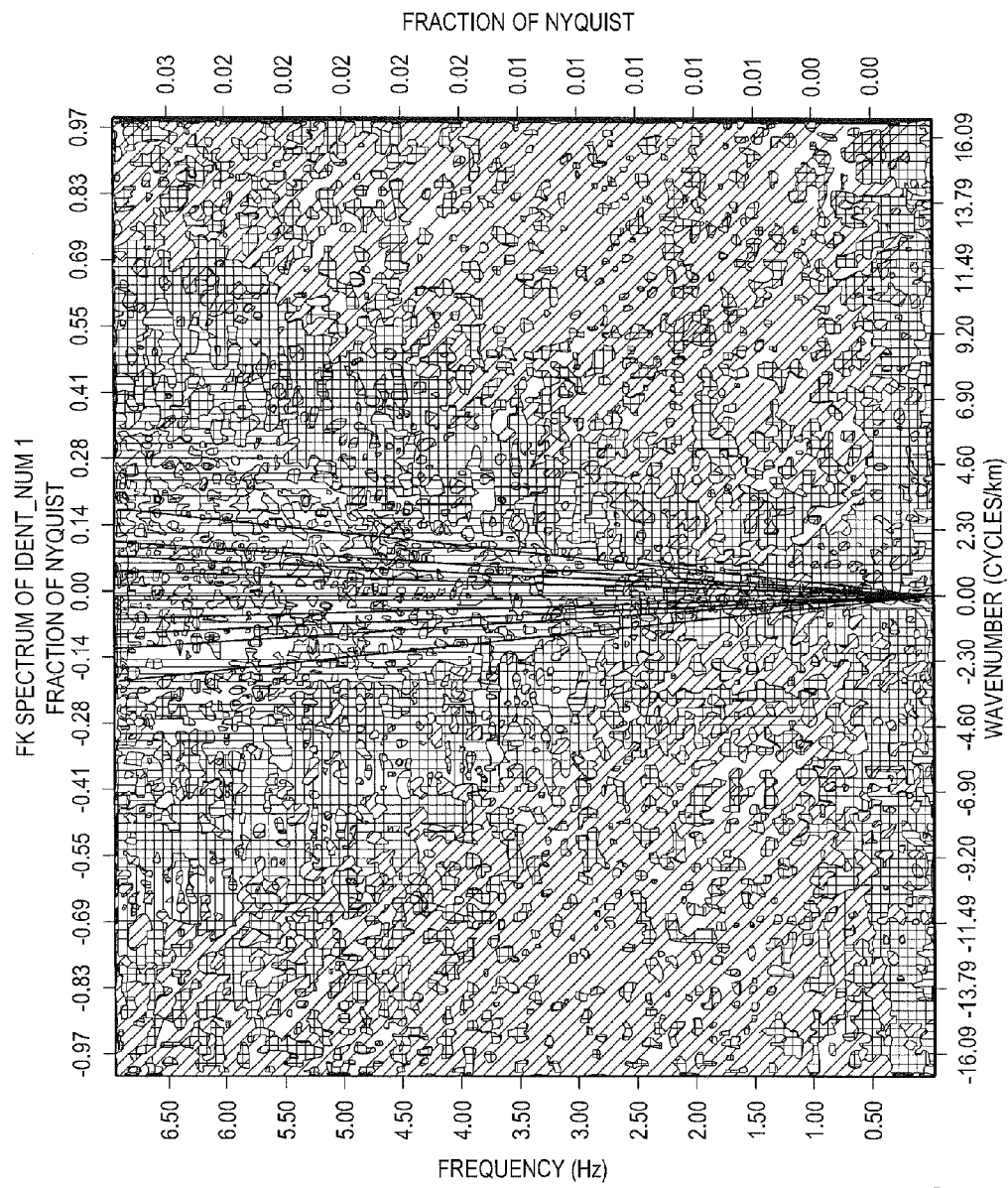
FIG. 5B is a display in the FK domain of the recorded low frequency passive seismic data of FIG. 5A.
Figure 5C:
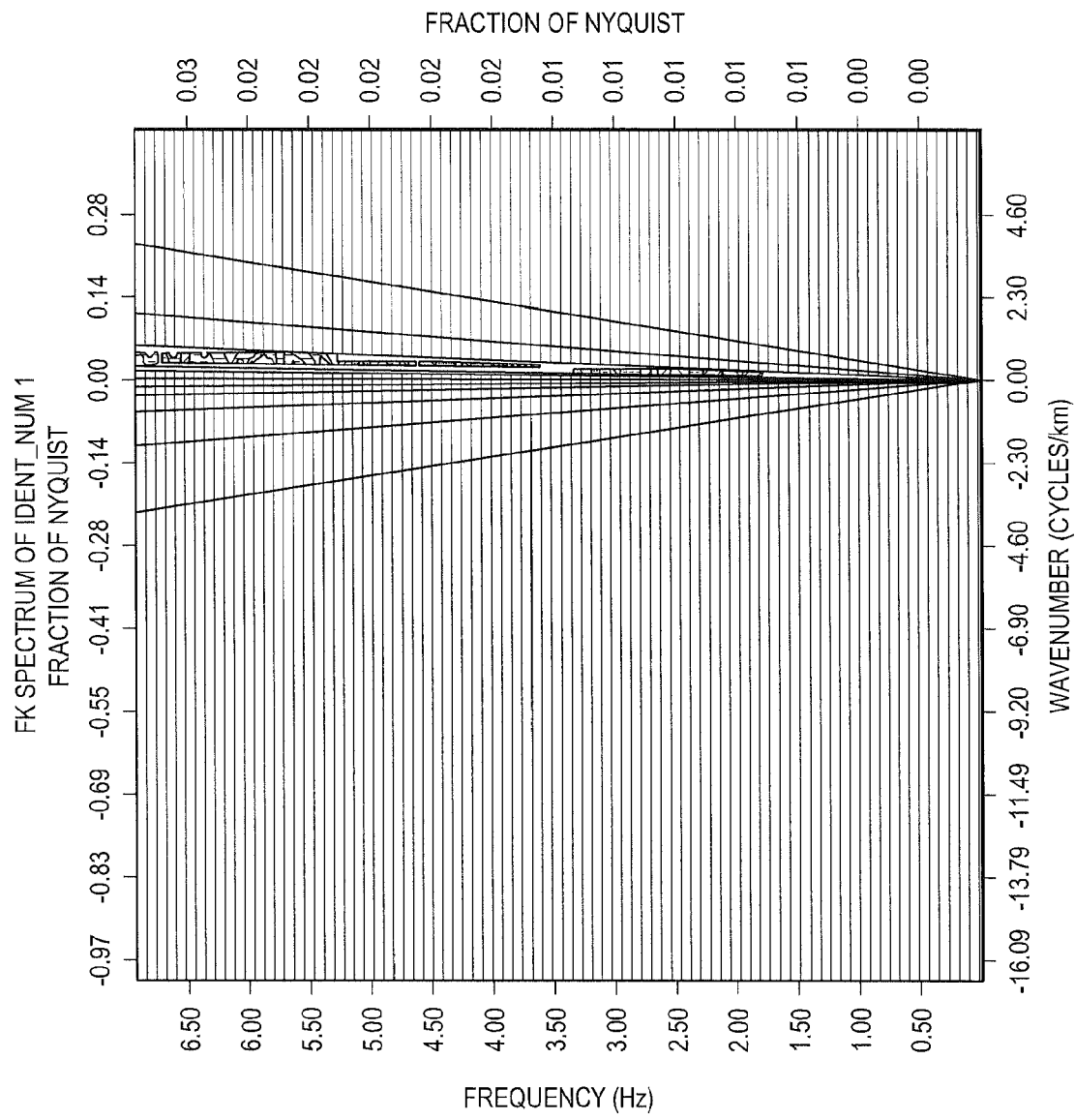
FIG. 5C is a display in the FK domain of the FK filter window (or portion) applied on the data to extract a mono-dominant velocity record.
Figure 5D:
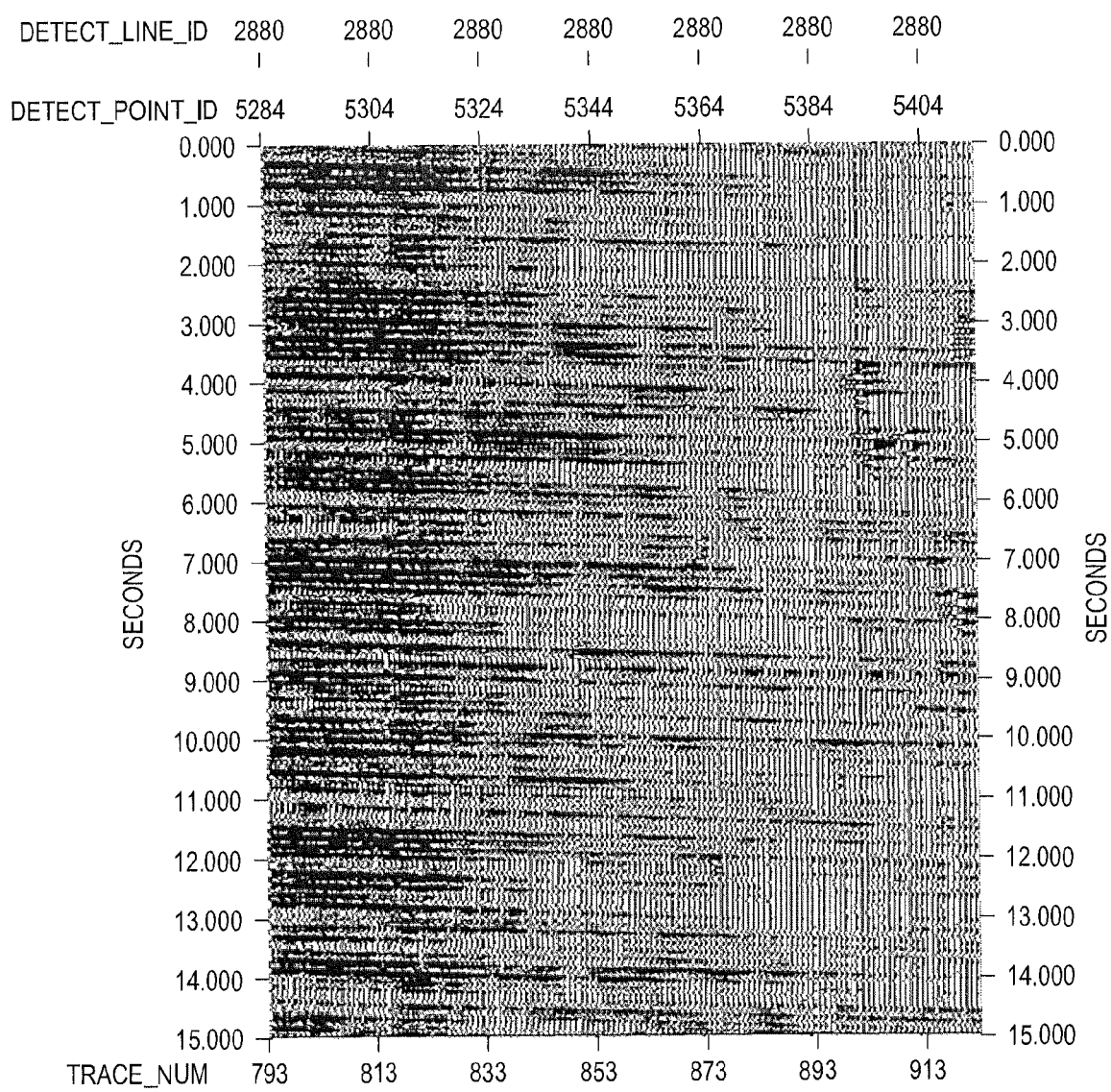
FIG. 5D is a display in the time domain of the output mono-dominant velocity record (as an example) after applying the FK filter of FIG. 5C on the processed record of FIG. 5A.

During the extraction process, certain ranges (portions) of dipping angles in the range from 0° to ±90° and velocities can be determined in the FK domain to extract coherent components (one at a time) of relatively high amplitude signals of the low frequency passive seismic data. That is, a certain range of certain upper and lower limits of velocities and dipping angles should be defined in order to collect seismic data of a coherent event. FIGS. 5A-5C shows an example of the extraction process of a single component through analyses in the FK domain. FIG. 5D show the resultant mono-dominant velocity display in time domain. The term "mono-dominant velocity" is introduced here due to the fact that filtering process in FK domain depends on extracting energy over defined range in a portion, and when a portion of determined range in the FK domain is extracted, some other minor components, if present, may be included as well in that portion.

Figures 1, 4A:
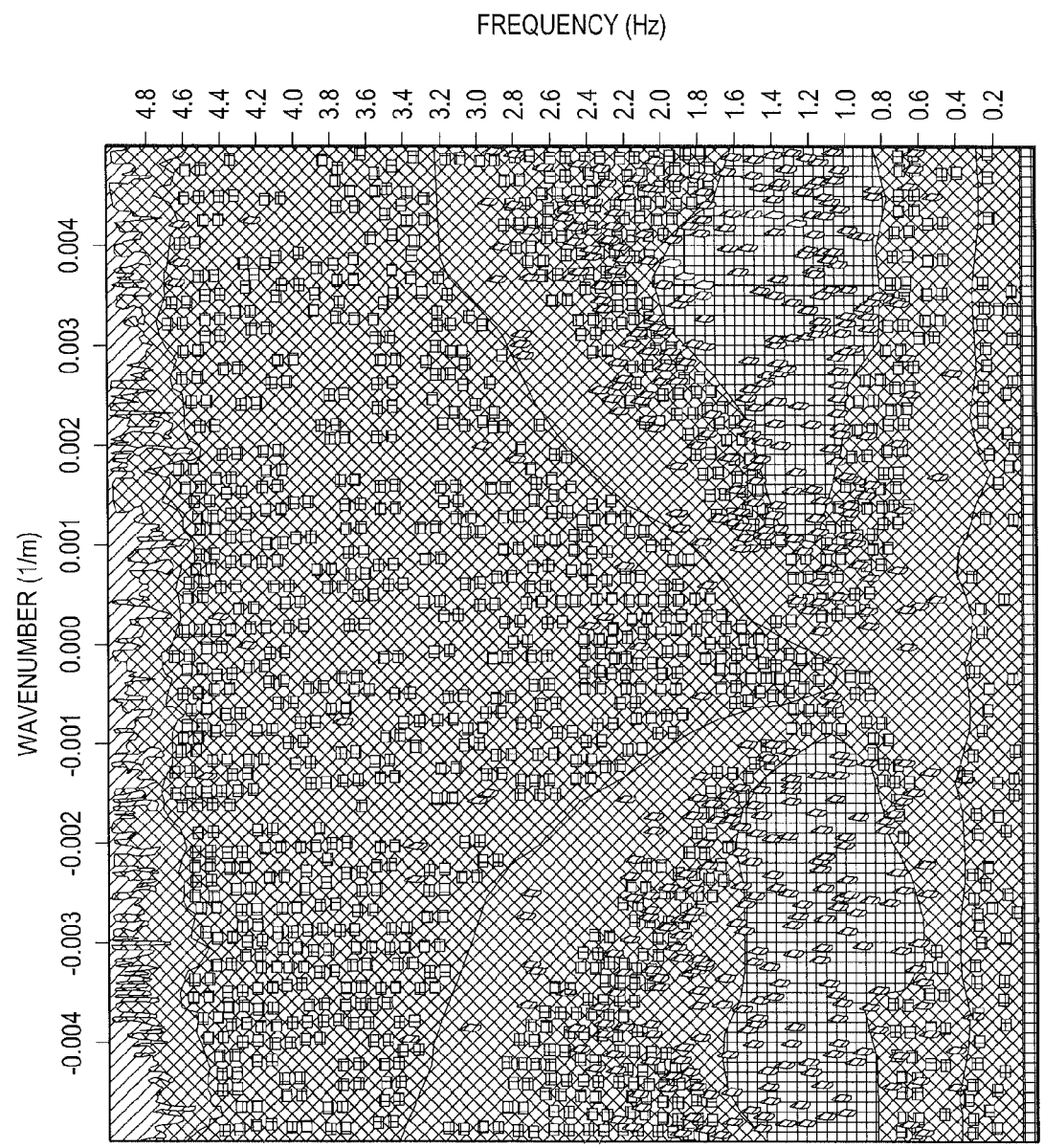
Figures 2, 4A:
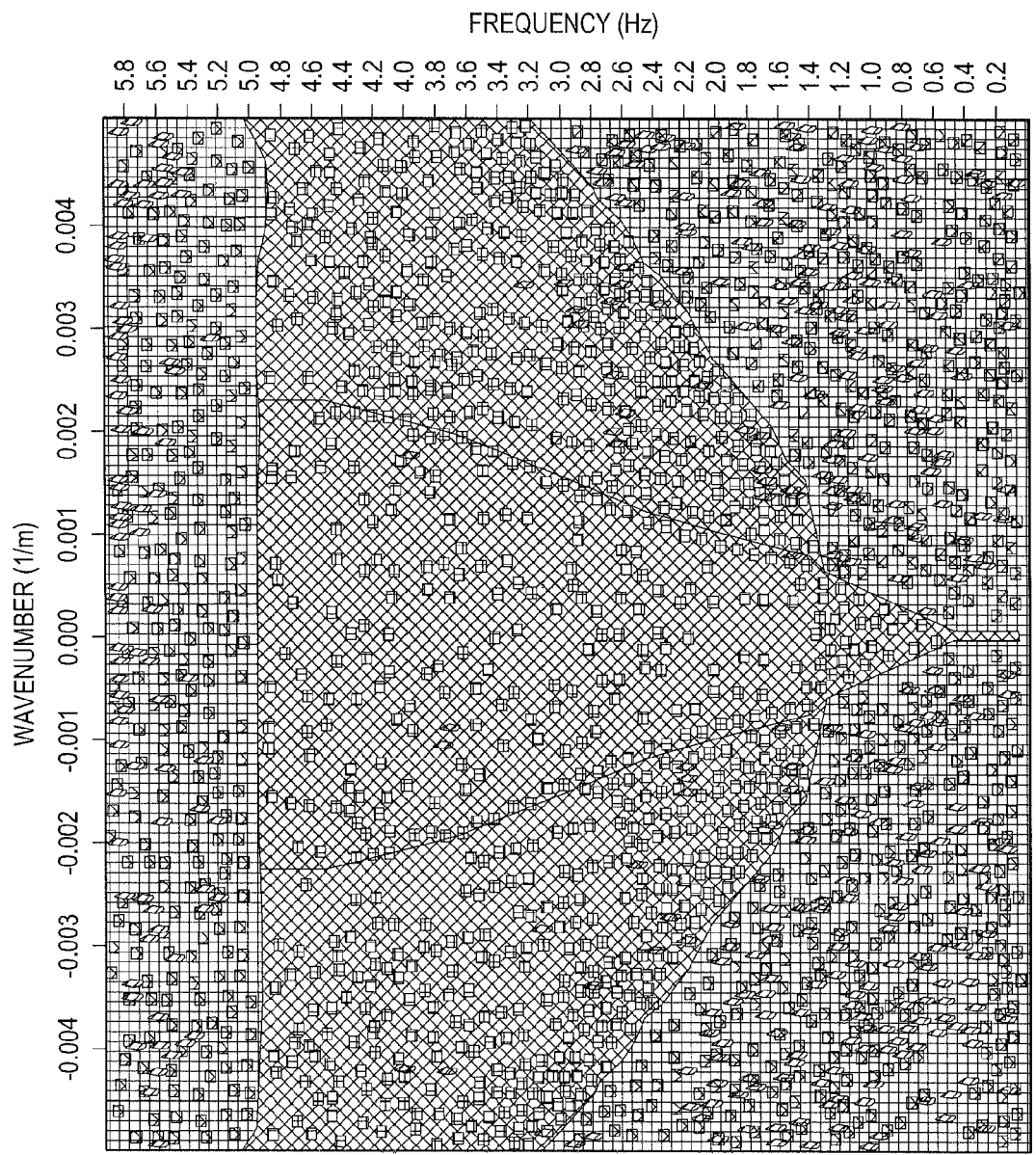
Figure 4B:
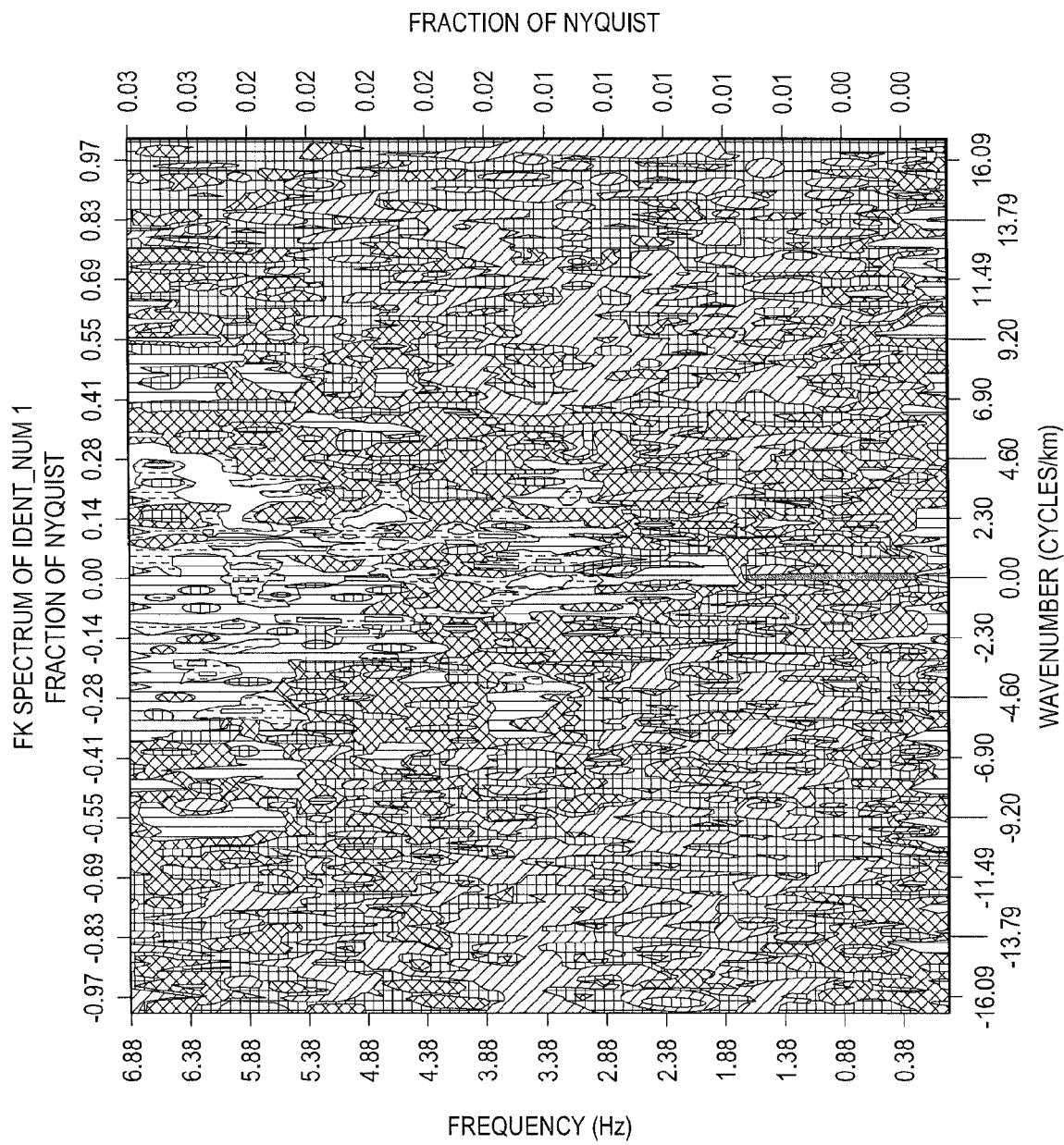
FIG. 4B is a display in the frequency-wavenumber domain of recorded low frequency passive seismic data of a receiver line.
Figure 4C:
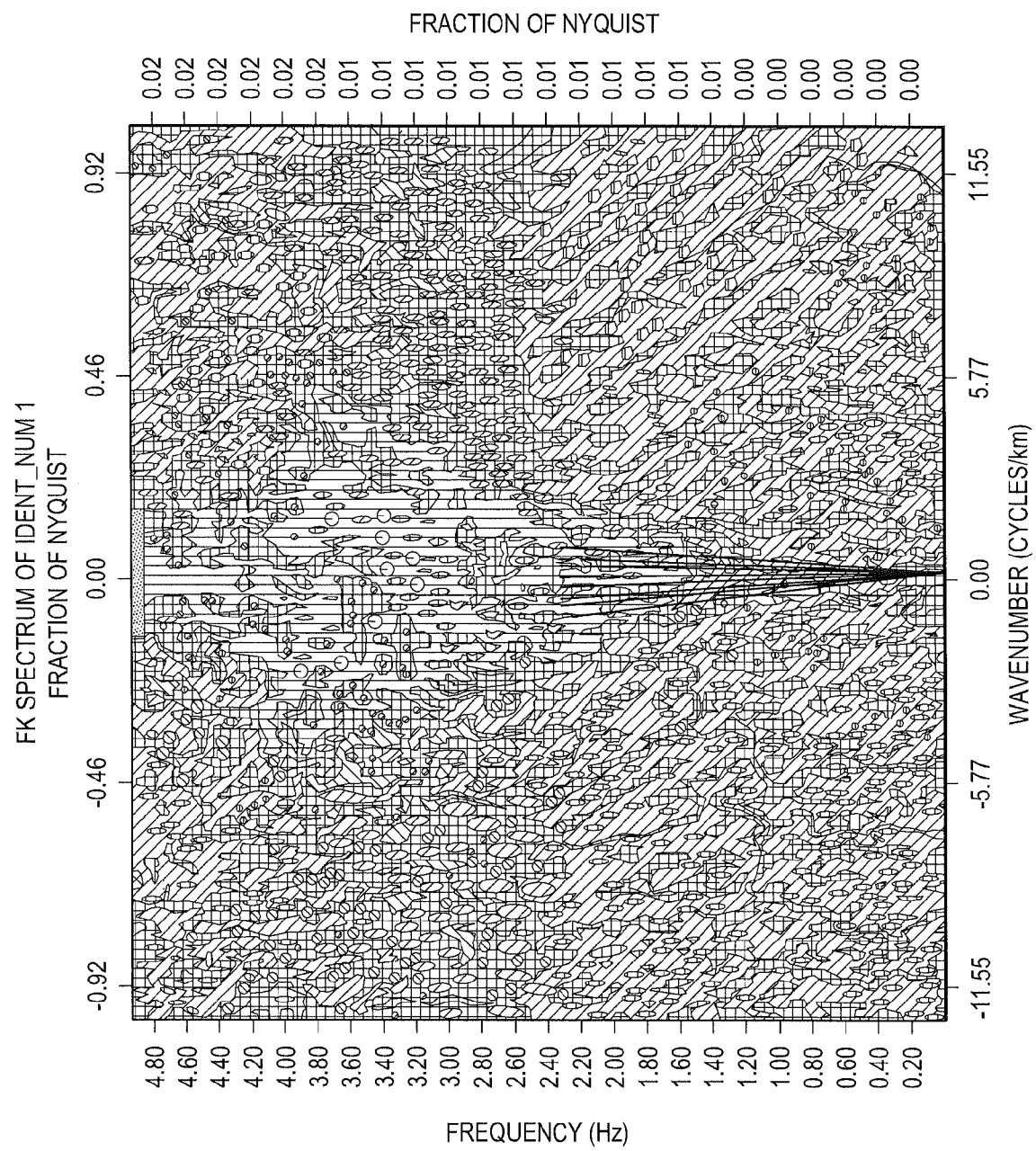
FIG. 4C is a display in the frequency-wavenumber domain of recorded low frequency passive seismic data of a receiver line.

Many kinds of waves can be detected in the low frequency passive seismic data with the present invention when the data are processed in the manner set forth above. For example, oceanic waves were detected having very low velocities and very low seismic frequency range of 0.1-0.3 Hz. These oceanic waves were found to be highly dependent on weather conditions. FIGS. 4A-1 and 4A-2 are good illustrations of effects of such conditions on the recorded oceanic waves of low frequency passive seismic data.

Some other waveforms have also been detected through FK analyses on the data being analyzed in the frequency range from 1.5-5 Hz. These types of wavefields can be classified based first on their wavefront dipping angles to span angles from 3° to 80° and second on velocities which can be in the range of 0.35-19 km/s. The P-waves have wavefront dipping angles in the range of 0-30°. The wavefront dipping angles for C-waves are in the range of 30-45°, and the wavefront dipping angles for surface waves are greater than 45°. This classification appears to depend mainly on the facts that P-waves are likely to convert to C-waves at angles beyond 30° and C-waves are likely to convert into surface waves at angles beyond 45° (FIGS. 6 through 17).

It should be kept in mind that these waves are deemed to be generated very deep below surface and can be recorded anywhere on the Earth. Consequently, through very short receiver lines on surface, one only can record very small portions of their wavefronts.

Every coherent component, extracted from process described in step 108, can be analyzed in time domain (step 110). However, when analyzed in the time domain, these waves should be treated as of one-way bathymetry. Thus, it can be analyzed before and after passing certain subsurface zones.

Every coherent component, extracted from process described in step 108, can be transformed into the frequency domain for further analyses (step 112). During step 114, synthetic models of low frequency seismic traces can also be generated in the time domain from available geo-data of drilled wells. During step 114, synthetic models of low frequency seismic traces can also be generated in the frequency domain from available geo-data of drilled wells.

During step 116, models generated from step 114 can then be correlated with all processed low frequency passive seismic data either in the time or frequency domains to generate correlation distribution maps. During step 118, the results from step 116 can then be interpreted and/or integrated with the available geo-data. The composite maps can then be utilized for analysis and evaluation of subsurface phenomena of geophysical interest.

In the past, seismic waves have been classified in low frequency seismology based mainly on velocities and arrival times, which was apparently due to the one-dimensional data sensing and recording systems. With the present invention, it is now possible to consider wavefront dipping angles as additional criteria for low frequency seismic waves. It is expected that the present invention can be used to help in mapping these waves over large areas. The resultant data can then be viewed, analyzed, and interpreted in 3-dimensional form, rather than current one-dimensional or limited two-dimensional lines.

P-waves of dipping angles 3°-6° were found having velocities of 9-19 km/s, so that they are classified as low frequency passive seismic "super" P-waves. P-waves of dipping angles 7°-10° were found having velocities of 6-8 km/s, so that they are classified as low frequency passive seismic "VHV", very high velocity P-waves. P-waves, P-C-marginal waves, and C-waves (11°-45°) are expected to be useful in hydrocarbon exploration applications. Further details about these waves are set forth below with respect to FIGS. 6 through 17, inclusive. Thus, with the present invention, low frequency passive seismic is expected to supplement if not provide an alternative to current conventional active seismic data acquisition.

Table 1 below contains a list of types of low frequency passive seismic waves detected and analyzed in both the FK and time domains of data has been recorded over a zone located southeast of Saudi Arabia. It is believed that the P-waves at angles from 11-30 degrees; the C-waves from 31-45 degrees and the surface waves at dip angles from 46-80 degrees should prove useful in hydrocarbon exploration and exploitation, and information regarding the other types of waves may have application in other geophysical fields.

TABLE 1

| Wave Type | Calculated/Observed Wavefront Dipping Angle (degrees) | Average Velocity Range (km/sec) |
| --- | --- | --- |
| Super P-wave | 3-6 | 19-9 |
| VHV P-waves | 7-10 | 8-6 |
| P-waves | 11-30 | 5-1.7 |
| C-waves | 31-45 | 1.7-1 |
| Surface waves | 46-80 | 0.9-0.35 |
| Oceanic waves | ~90 | 0.02-0.04 (approx.) |

Figure 6:
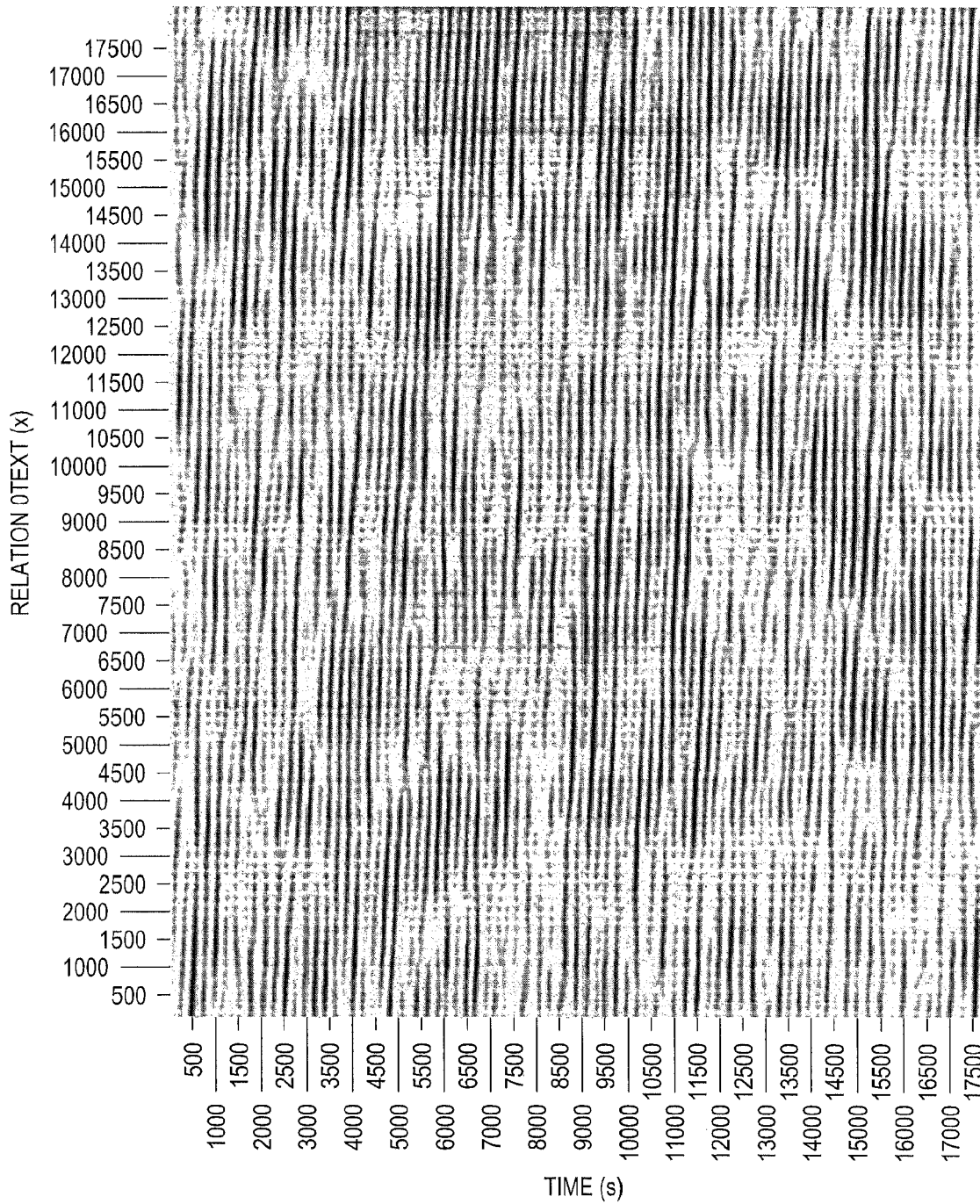
FIGS. 6, 7, 8, 9, 10, 11, 12, 13, 14, 15, 16 and 17 are displays of various types of mono-dominant velocity (coherent components) of low frequency passive seismic waves in the time domain.
Figure 7:
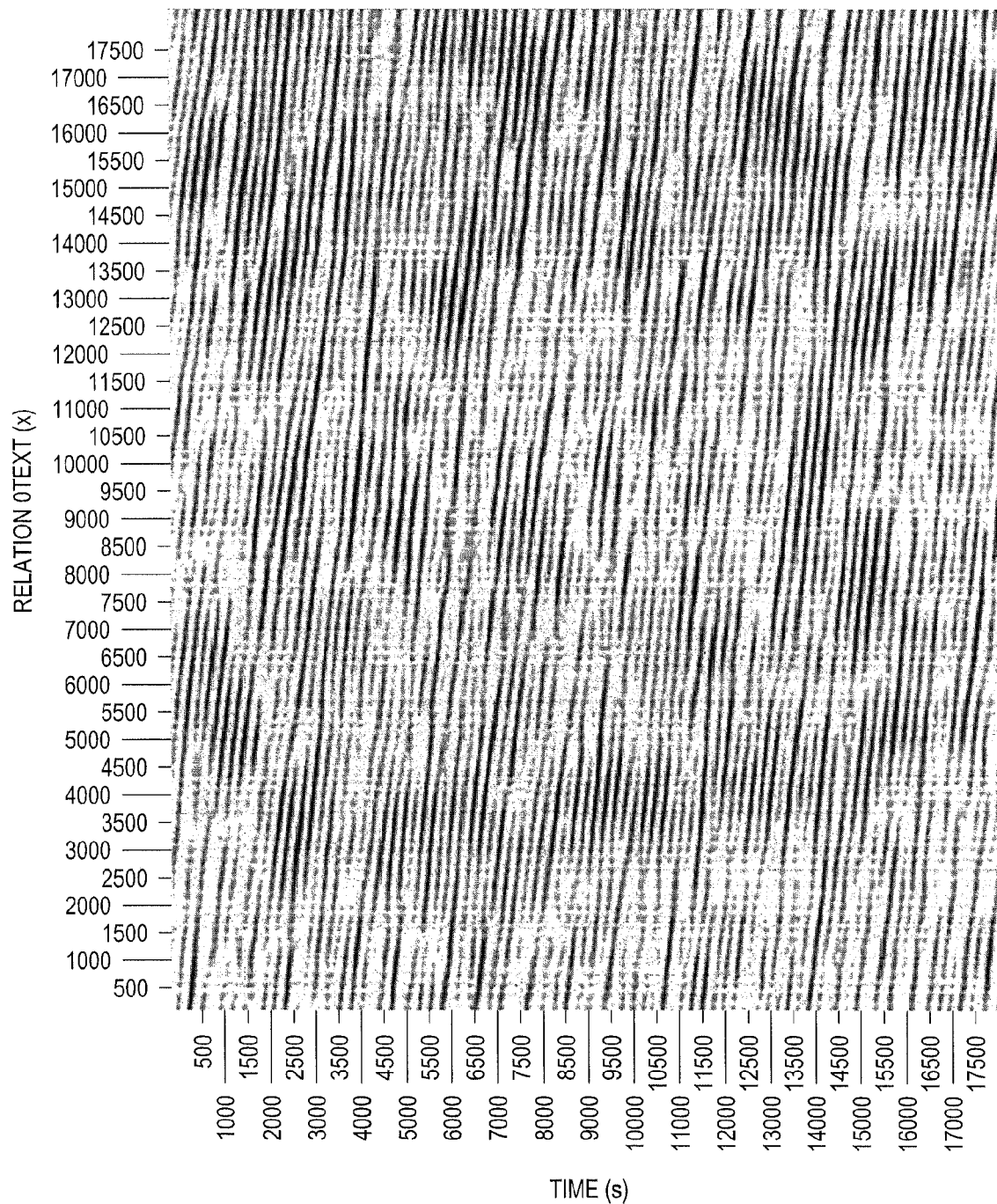
Figure 8:
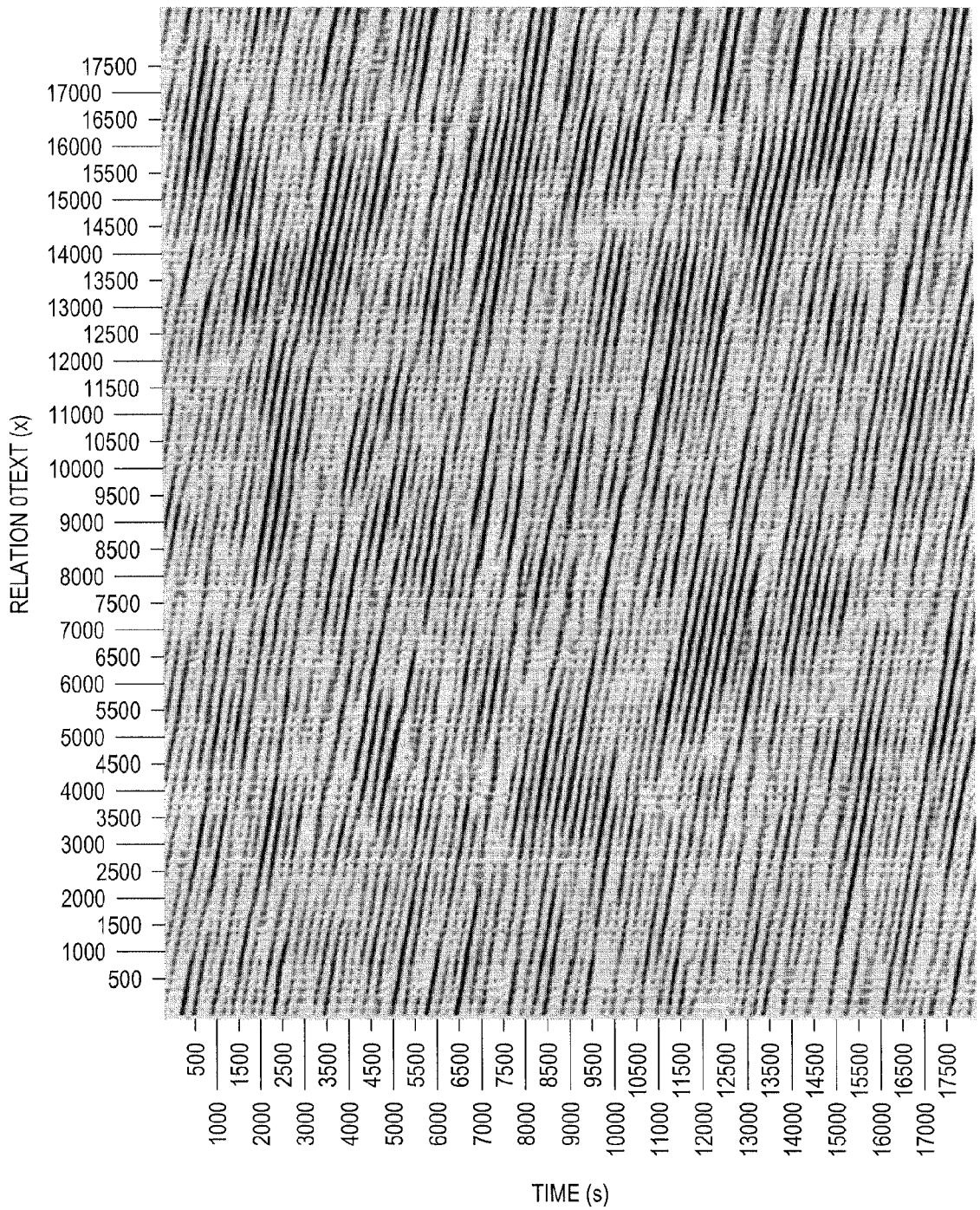
Figure 9:
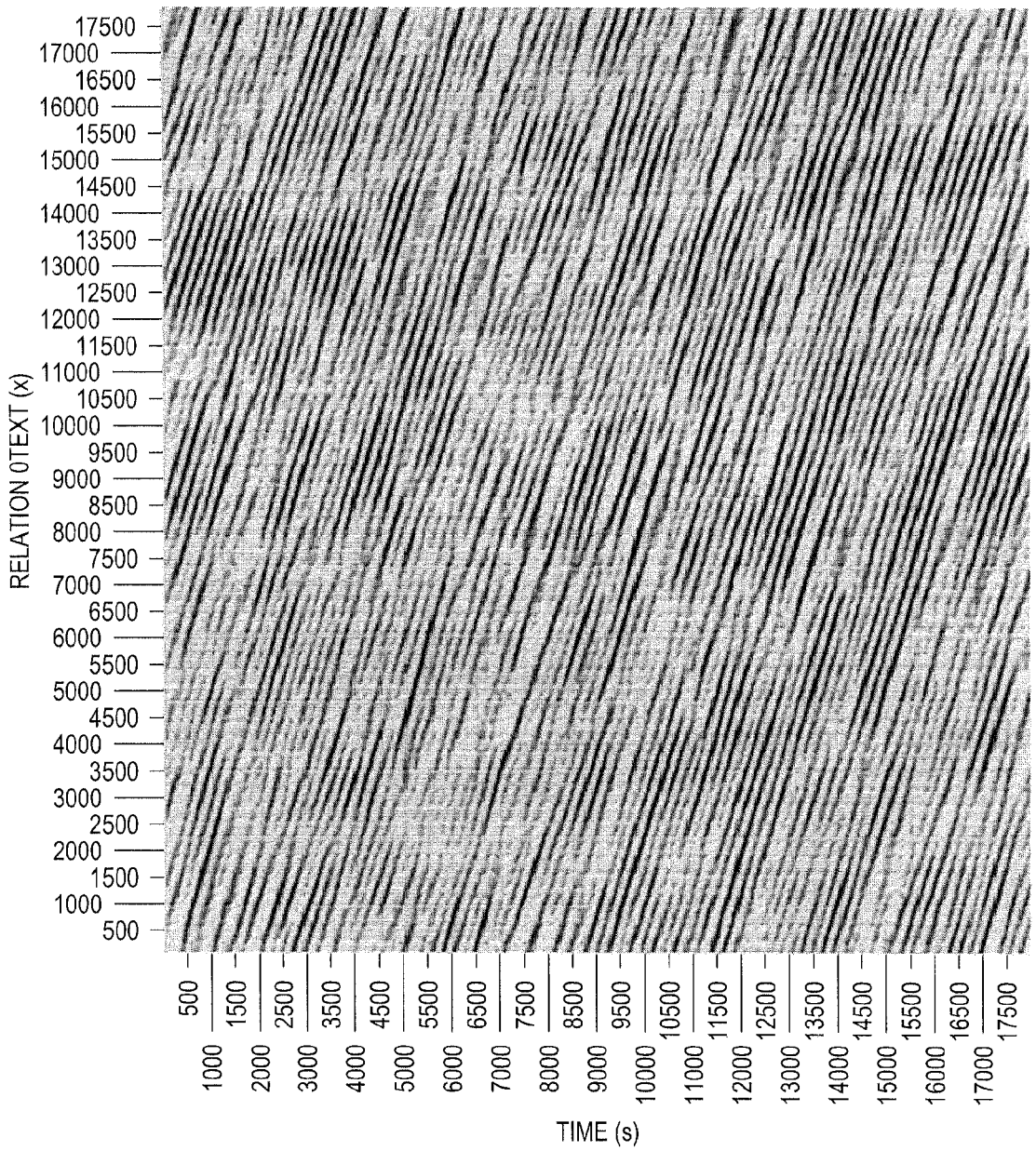
Figure 10:
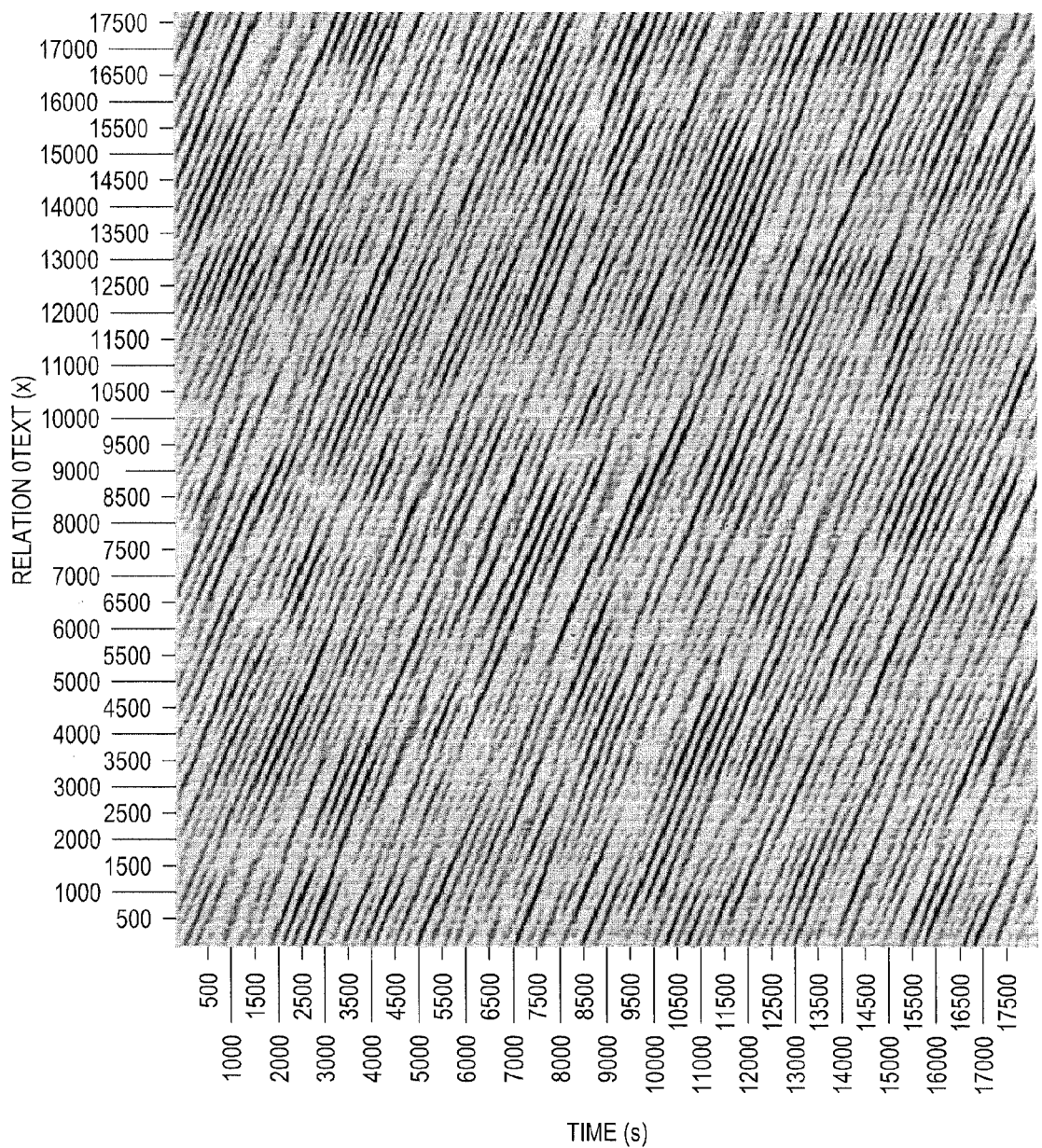
Figure 11:
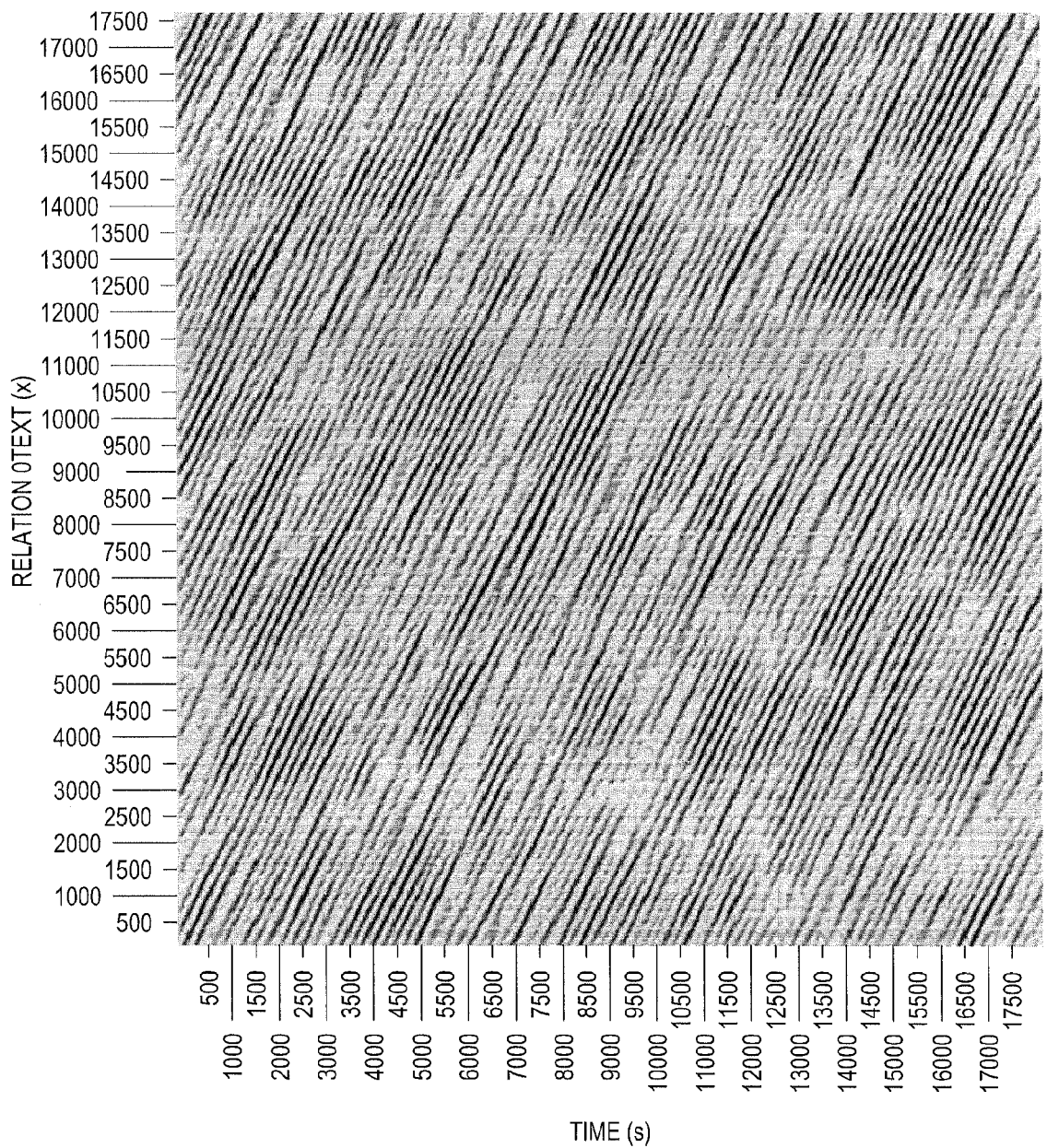
Figure 12:
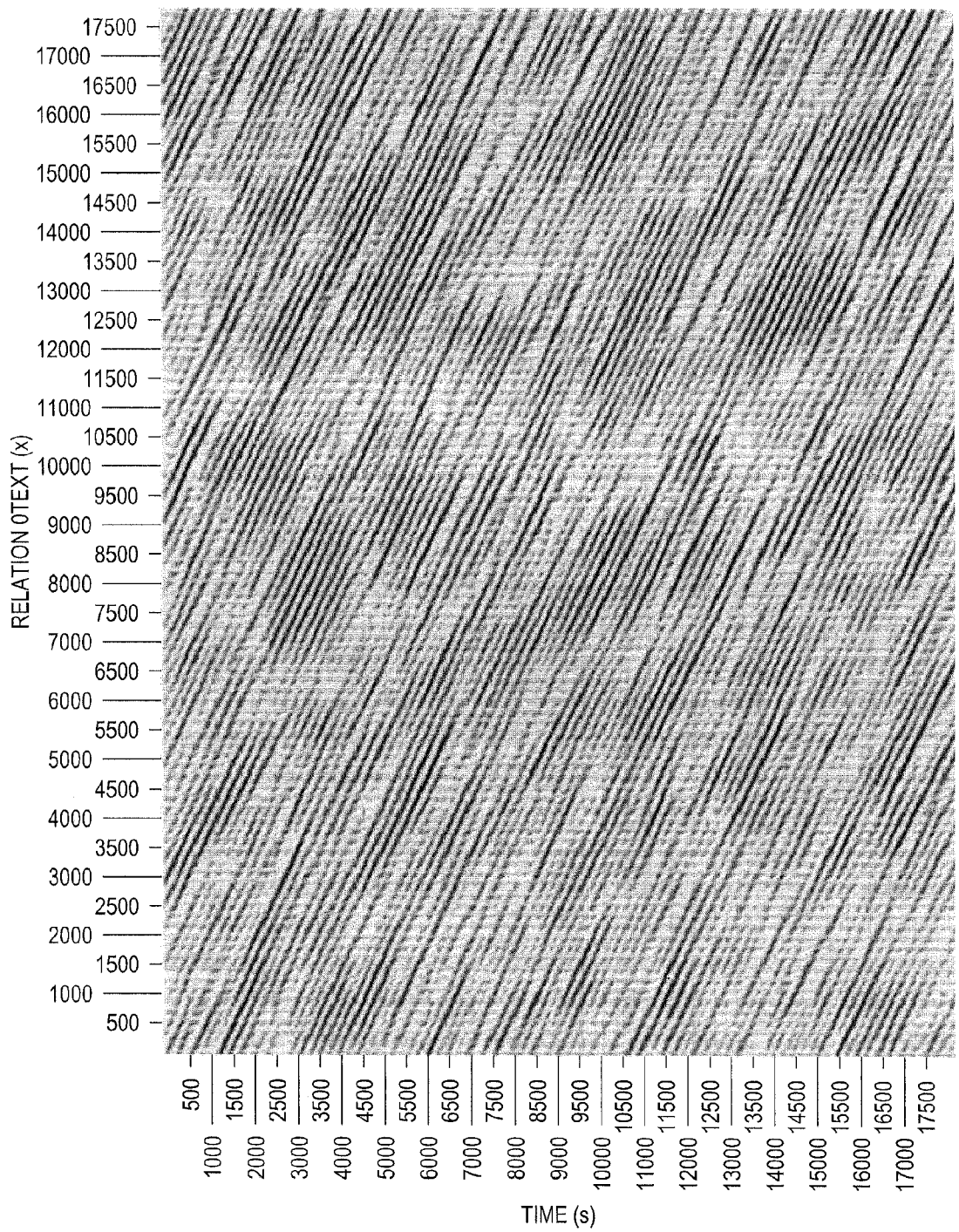
Figure 13:
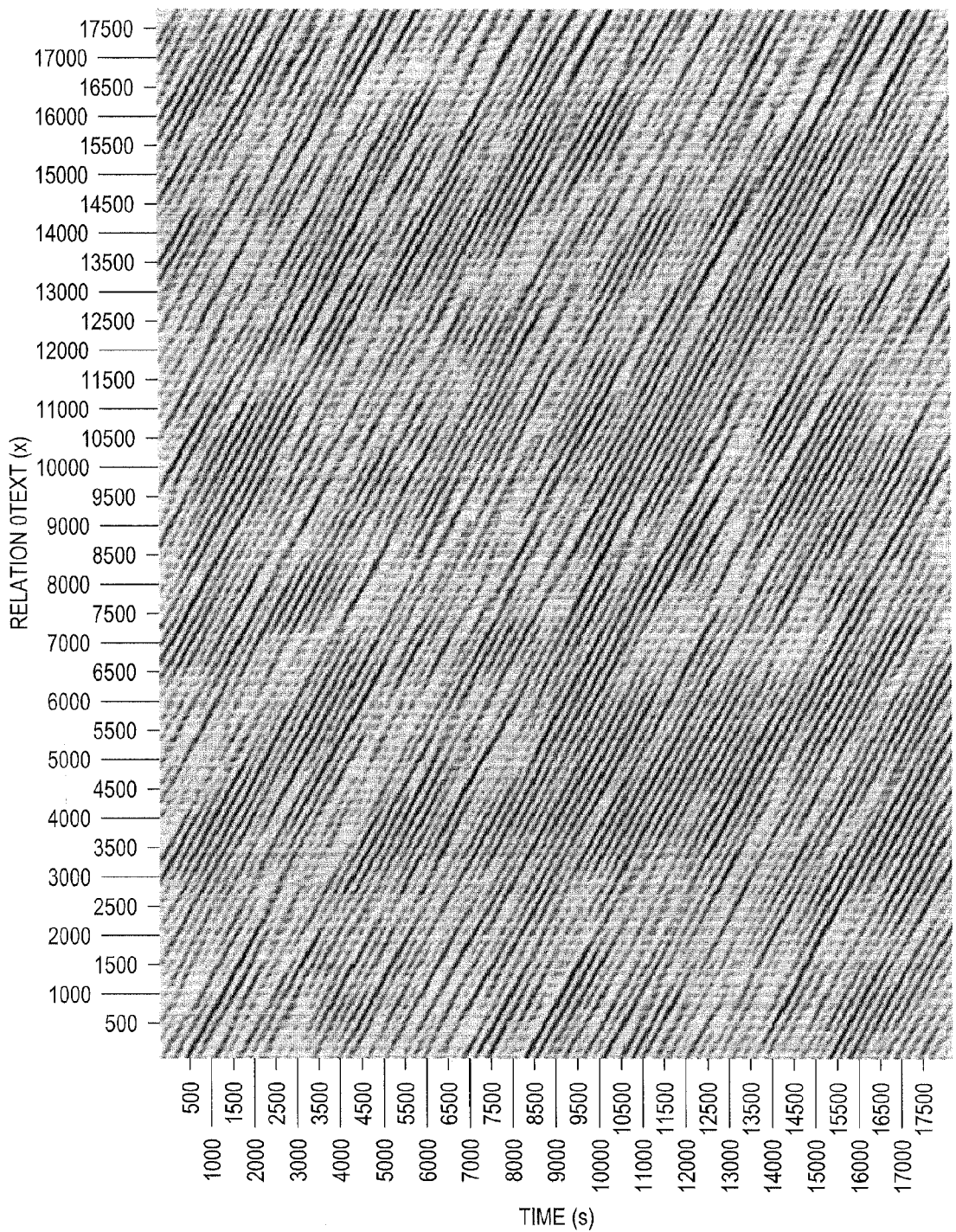
Figure 14:
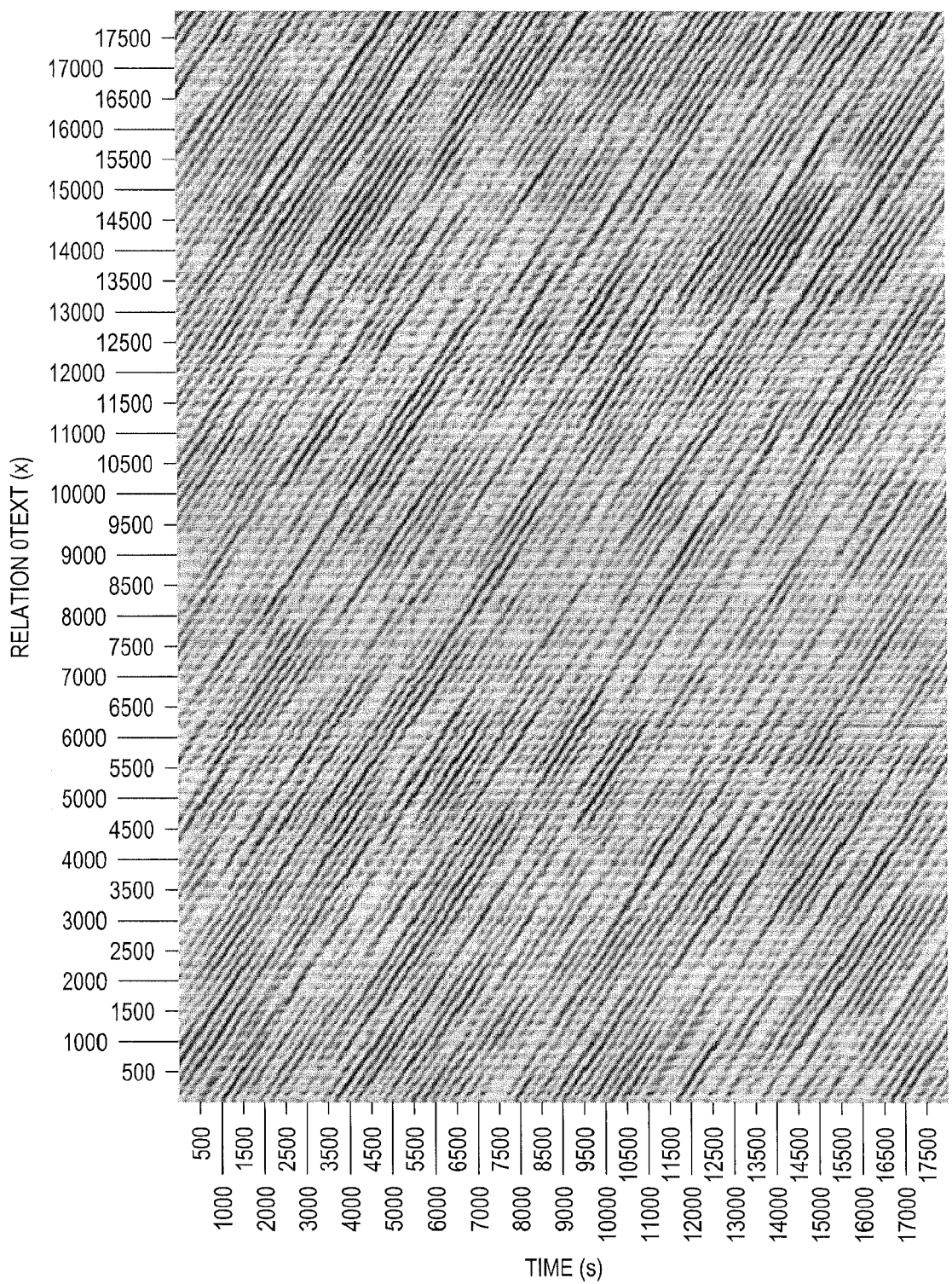
Figure 15:
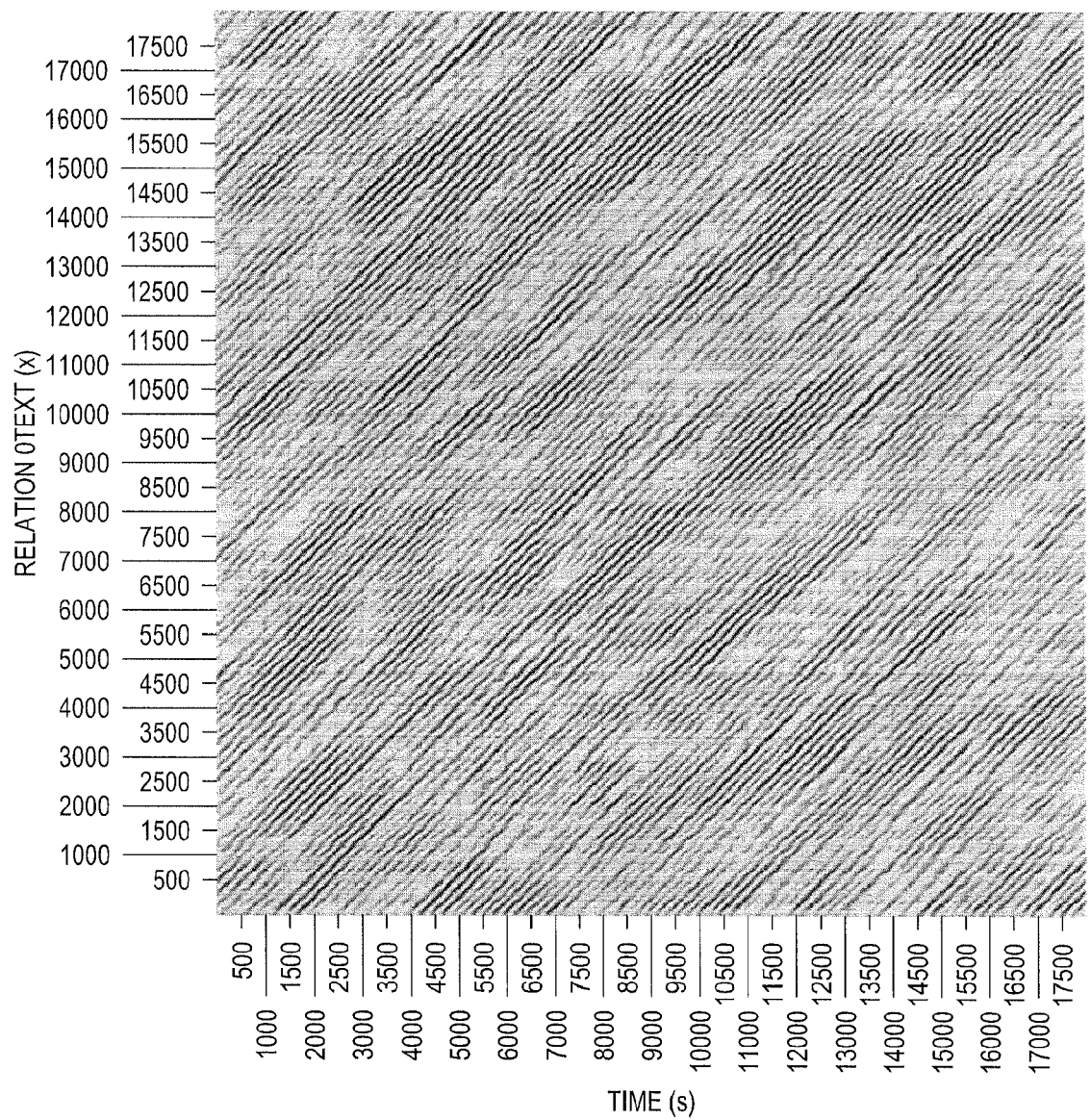
Figure 16:
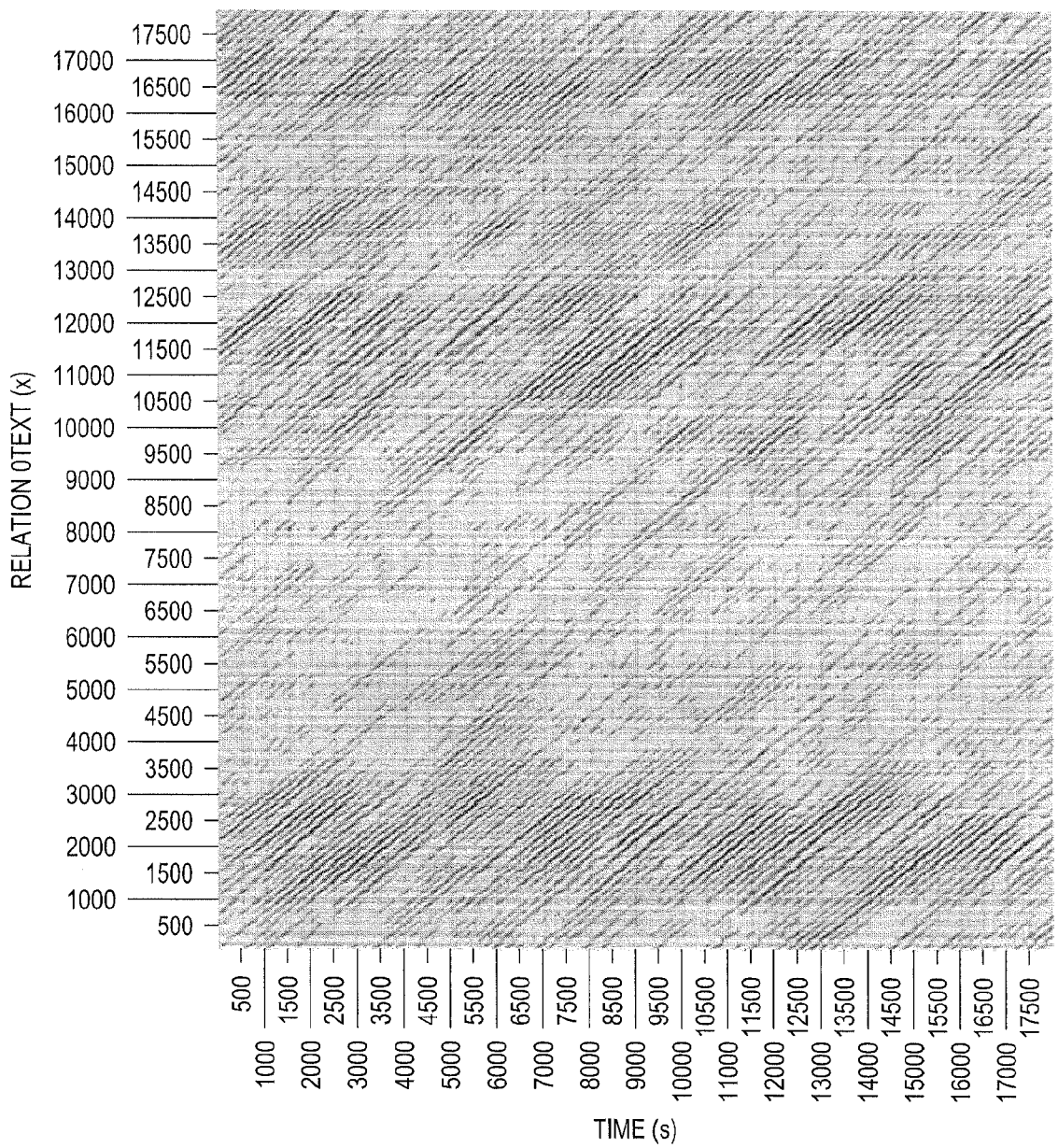
Figure 17:
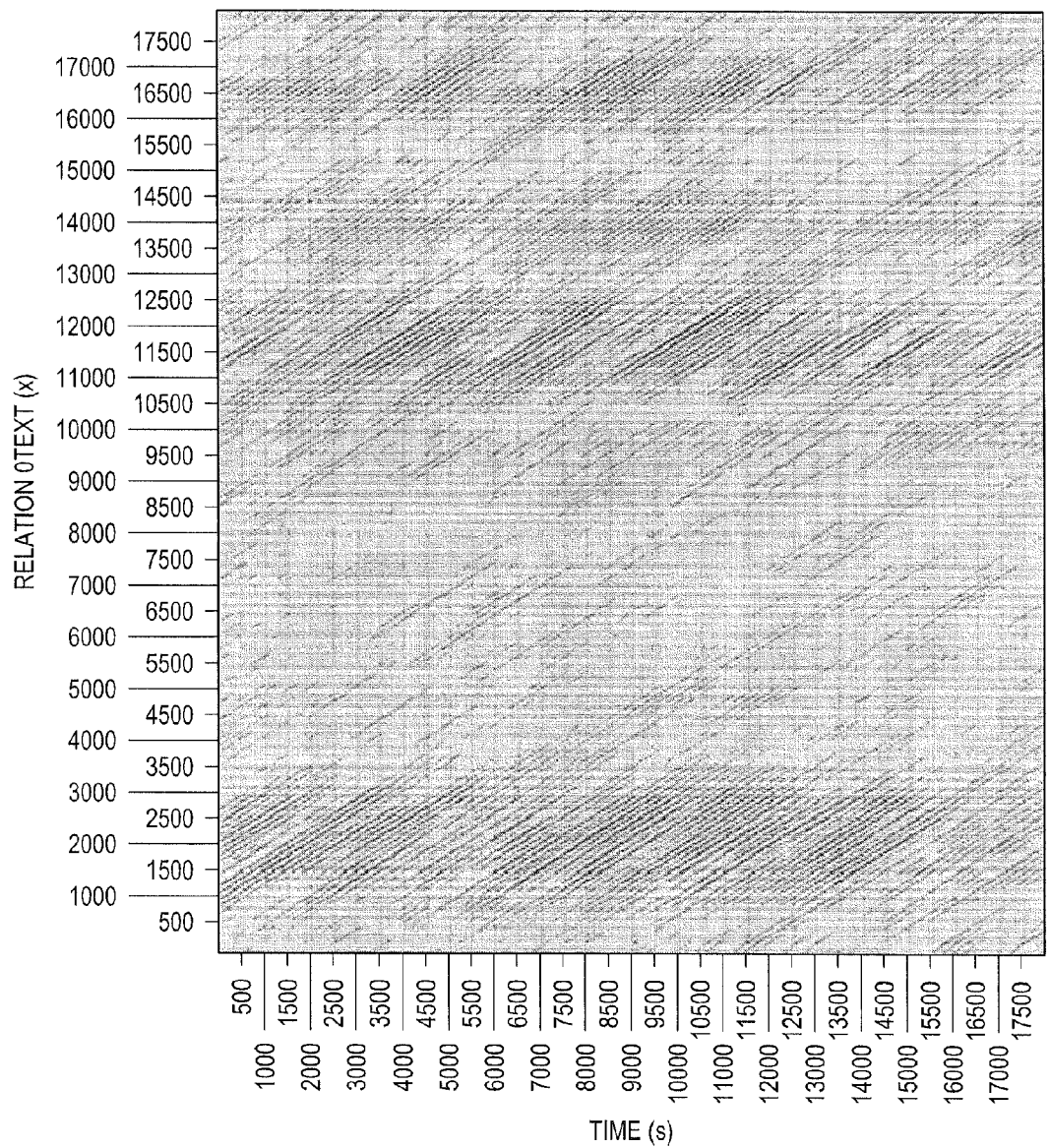
Figure 18:
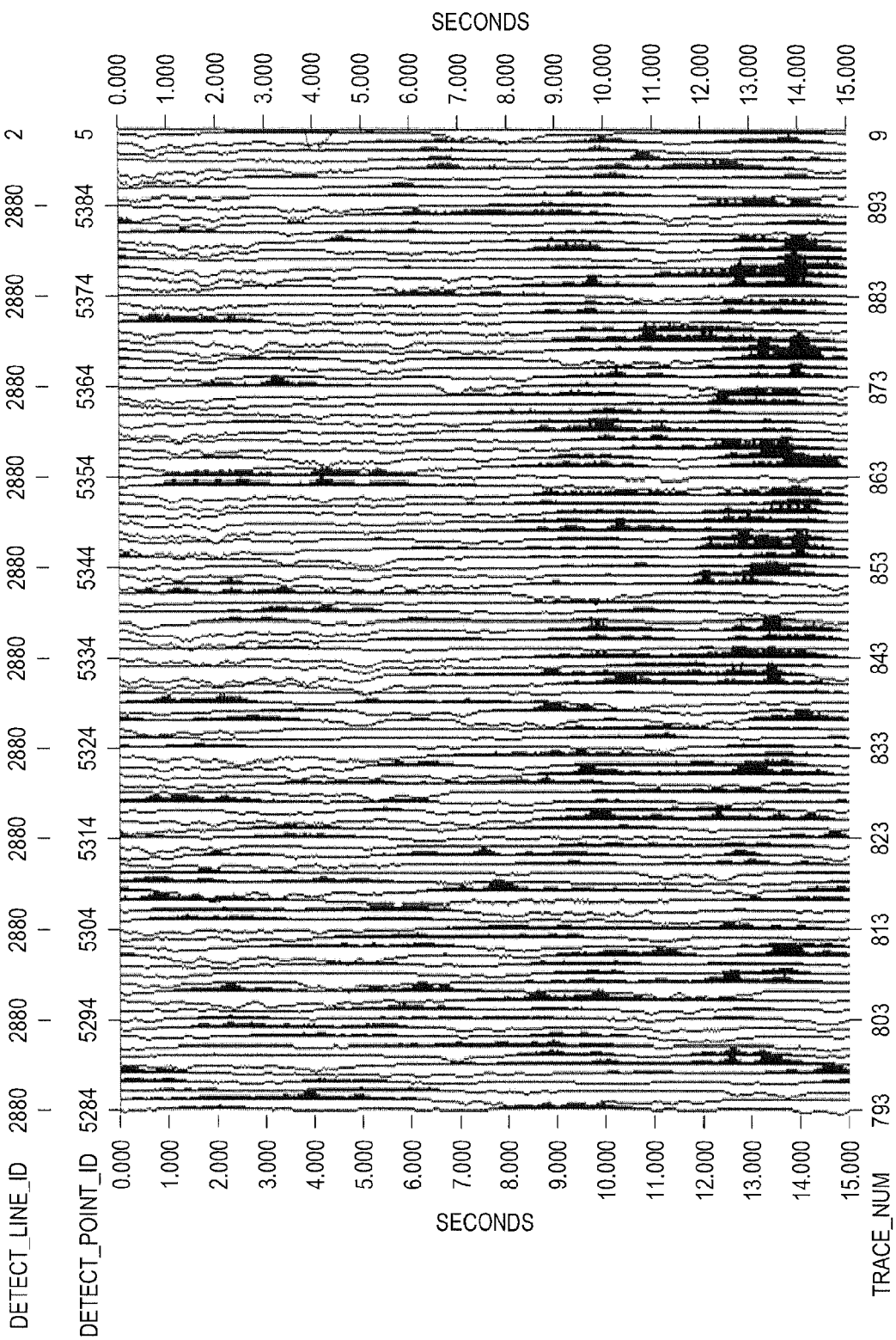
FIG. 18 is a display in the time domain of oceanic wave component of a low frequency passive seismic data record of a receiver line.

FIGS. 6 through 18 illustrate some examples in time domain of the recorded low frequency passive seismic waves (coherent components) listed in Table 1. FIG. 6 is a display in the time—relative offset domain of what is referred to as a Super P-wave in Table 1. FIG. 7 is a display in the time—relative offset domain of what is referred to as a VHV P-wave in Table 1. FIGS. 8, 9 and 10 are displays the time—relative offset domain of what are referred to as P-waves in Table 1. FIGS. 11, 12, 13, 14 and 15 are displays in the time—relative offset domain of what are referred to as C-waves in Table 1. FIGS. 16 and 17 are displays in the time—relative offset domain of what are referred to as surface waves in Table 1. FIG. 18 is a display in the time—relative offset domain of what are referred to as oceanic waves in Table 1.

Figure 19:
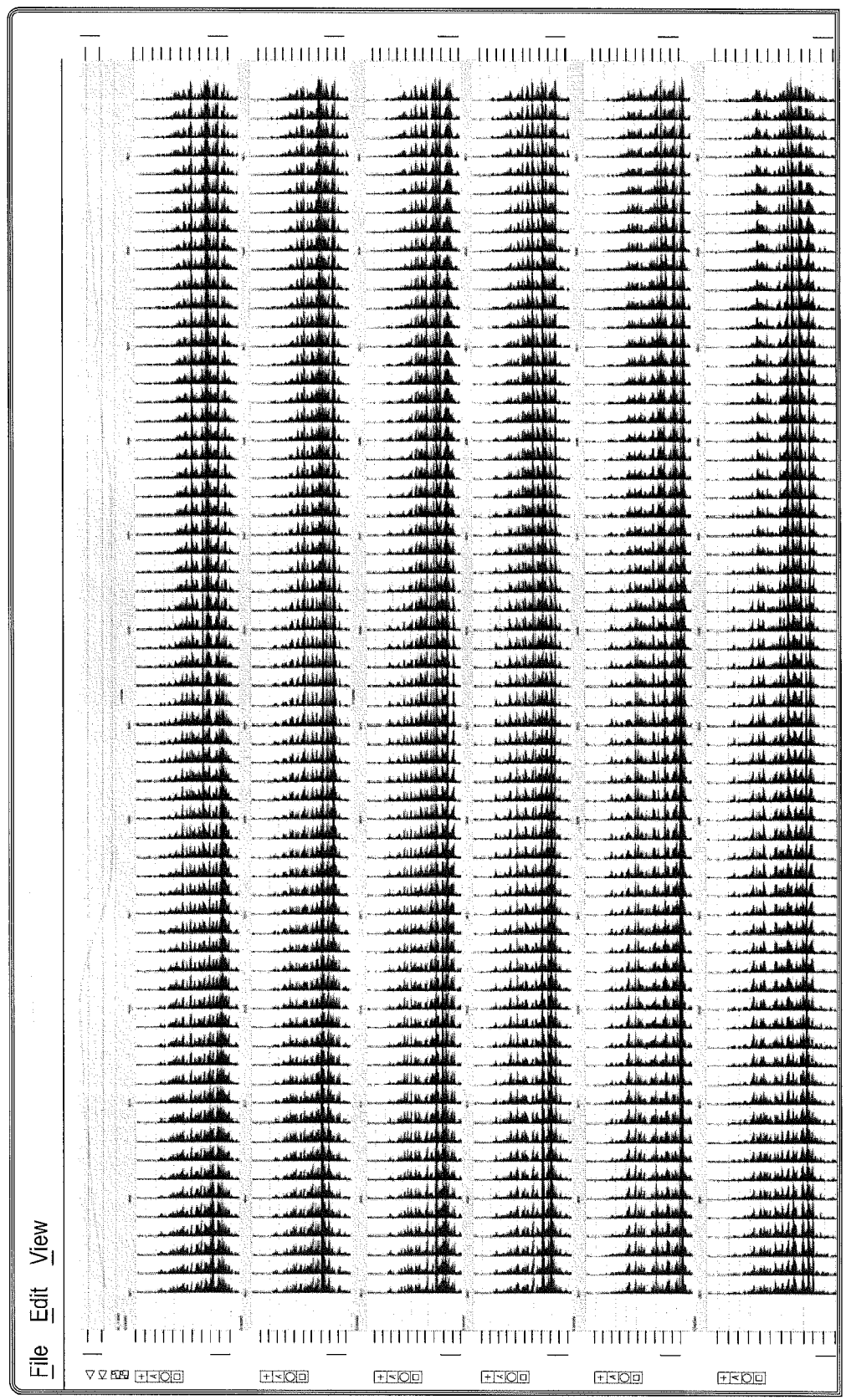
FIG. 19 is a display in the frequency domain of low frequency passive seismic data records of a receiver line in different mono-dominant velocities after applying 0-5 Hz band pass filter and FK decomposition process.

Waves in FIGS. 6 through 17 can also be transformed into the frequency domain to check for anomalies at frequencies in the range of 0-5 Hz. FIG. 19 illustrates, however, examples of some displays from a single receiver line of some different mono-dominant velocities (coherent components) in the frequency domain.

Due to their very high velocities (9-19 km/s), these P-waves were classified as "super" low frequency passive seismic P-waves. In addition, these waves have relatively high amplitudes when amplified, an apparent period of 300 msec, and an almost vertical propagation relative to Earth's surface. These waves are believed to be generated from the Earth's core and to provide very valuable information concerning deep Earth layers, e.g., core, mantle, etc. Due to their very low dipping front angles, these waves do not need to be rotated.

Other P-waves and C-waves of the types illustrated in the displays of FIGS. 7 through 15 are believed to be useful for hydrocarbon reservoirs studies. These waves can, if desired, be rotated in order to analyze them. These waves span velocities range from 1-8 km/s and can be analyzed separately as mono-dominant velocity records in either the time or frequency domain or both. Most of these waves were observed having apparent period of about 300 msec, and consequently their dominant frequency is about 3.33 Hz. They can be evaluated, in the time domain, regarding their potentials to provide useful information about reservoirs and geologic formations. Consequently, they should be analyzed before and after passing certain zones of interest to check for anomalies. As a result, direct hydrocarbon indicators or DHI can be conducted with more confidence than the current methods being deployed in the industry.

With this current invention, unlimited numbers of traces can be acquired, processed and then correlated with low frequency based models derived from well data to generate different attributes maps. This can be performed either in the time or frequency domains. These traces can be raw processed data or mono-dominant velocity ones.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined computer system, or in the implementation of the methodology, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of acquiring low frequency seismic data about the travel of naturally occurring seismic waves through the earth in a region of interest, comprising the steps of:
    deploying uniaxial sensors along a receiver line at the surface of the earth in the region of interest;
    sensing with the deployed uniaxial sensors movements of the earth in response to the travel of naturally occurring seismic waves;
    forming a record of sensed earth movements as a function of time to form passive seismic data;
    bandpass filtering the passive seismic data to remove frequency components above a low frequency limit;
    decomposing the bandpass filtered passive seismic data in the FK (frequency-wavenumber) domain into coherent mono-dominant velocity and dip-angle components; and
    processing the decomposed bandpass filtered passive seismic data.

2. The method of claim 1, further including the step of:
    forming a display of the processed decomposed passive seismic data.

3. The method of claim 1, wherein the frequency of the bandpass filtering is below a low frequency limit of 10 Hz.

4. The method of claim 3, wherein the bandwidth of the bandpass filtering is from 0 to 7 Hz.

5. The method of claim 1, further including the step of:
    forming a display of the bandpass filtered low frequency passive seismic data in the FK (frequency-wavenumber) domain.

6. The method of claim 1, wherein the step of processing comprises the step of:
    forming a measure of observed coherent dip-angle components of the decomposed bandpass filtered passive seismic data.

7. The method of claim 6, further including the step of:
    forming at least one display of the measure of coherent dip-angle components in the frequency domain of the bandpass filtered low frequency passive seismic data.

8. The method of claim 1, wherein the step of processing comprises the step of:
    forming a measure of observed coherent mono-dominant velocity components of the decomposed bandpass filtered passive seismic data.

9. The method of claim 1, further including the step of:
    forming at least one display of coherent components decomposed out of the bandpass filtered low frequency passive seismic data.

10. The method of claim 1, further including the steps of:
    analyzing the mono-dominant velocity and dip-angle components of the decomposed passive seismic data;
    forming at least one synthetic data model based on well data: and
    generating a correlation distribution map of correlation of mono-dominant velocity and dip-angle components of the decomposed passive seismic data with the at least one synthetic data model.

11. A method of acquiring low frequency seismic data about the travel of naturally occurring seismic waves through the earth in a region of interest, comprising the steps of:
    deploying uniaxial sensors along a receiver line at the surface of the earth in the region of interest;
    sensing with the deployed uniaxial sensors movements of the earth in response to the travel of naturally occurring seismic waves;
    forming a record of sensed earth movements as a function of time to form passive seismic data;
    bandpass filtering the passive seismic data to remove frequency components above a low frequency limit;
    decomposing the bandpass filtered passive seismic data in the FK (frequency-wavenumber) domain into coherent dip-angle components; and
    processing the decomposed bandpass filtered passive seismic data.

* * * * *